US012751465B2

(12) United States Patent
Sandelman

(10) Patent No.: US 12,751,465 B2
(45) Date of Patent: Oct. 6, 2026

(54) METHOD OF CONTROLLING THE ENVIRONMENT IN A GROW ROOM

(71) Applicant: JDS Consulting LLC, North Springfield, VT (US)

(72) Inventor: David Sandelman, Perkinsville, VT (US)

(73) Assignee: JDS Consulting LLC, VT (US)

( * ) Notice: Subject to any disclaimer, the term of this patent is extended or adjusted under 35 U.S.C. 154(b) by 186 days.

(21) Appl. No.: 18/588,135

(22) Filed: Feb. 27, 2024

(65) Prior Publication Data

US 2024/0196913 A1 Jun. 20, 2024

Related U.S. Application Data

(60) Continuation-in-part of application No. 17/748,109, filed on May 19, 2022, now Pat. No. 12,402,640, (Continued)

(51) Int. Cl.
*A23B 4/03* (2006.01)
*A23B 4/037* (2006.01)
(Continued)

(52) U.S. Cl.
CPC .............. *A23B 4/031* (2013.01); *A23B 4/037* (2013.01); *A23B 11/604* (2025.01); *F25B 21/02* (2013.01);
(Continued)

(58) Field of Classification Search
CPC ....... A23B 4/031; A23B 11/604; A23B 4/037; F25B 21/02; F25D 13/00; F25D 17/02; F25D 29/00; F25D 2317/04111; F25D 2700/12; F26B 19/00; F26B 25/225; A23V 2002/00
See application file for complete search history.

(56) References Cited

U.S. PATENT DOCUMENTS 2,325,061 A 7/1943 Kaufman
2,650,882 A 9/1953 Sperti ........................... 426/248
(Continued)

FOREIGN PATENT DOCUMENTS

JP S 62-177608 A 4/1987
JP 2017-146052 A 8/2017
(Continued)

OTHER PUBLICATIONS

Supplementary European Search Report in European Application No. 18745080.4.
(Continued)

*Primary Examiner* — Larry L Furdge
(74) *Attorney, Agent, or Firm* — OSTROLENK FABER LLP

(57) ABSTRACT

A method that controls the conditions of a grow room in which independent feedback loops control the dry bulb temperature and the dew point to control the vapor pressure deficit in the grow room in order to slow down or prevent condensation that may promote the growth of mold, mildew, or microbes on the plants, or to slow down or prevent condensation that may promote pest infestation on the plant.

16 Claims, 12 Drawing Sheets

Related U.S. Application Data which is a division of application No. 16/261,075, filed on Jan. 29, 2019, now Pat. No. 11,369,119, which is a continuation of application No. 15/414,716, filed on Jan. 25, 2017, now Pat. No. 10,674,752.

(60) Provisional application No. 63/487,476, filed on Feb. 28, 2023, provisional application No. 62/721,019, filed on Aug. 22, 2018, provisional application No. 62/662,925, filed on Apr. 26, 2018, provisional application No. 62/625,161, filed on Feb. 1, 2018.

(51) Int. Cl.

| | |
|---|---|
| ***A23B 11/60*** | (2025.01) |
| ***F25B 21/02*** | (2006.01) |
| ***F25D 13/00*** | (2006.01) |
| ***F25D 17/02*** | (2006.01) |
| ***F25D 29/00*** | (2006.01) |
| ***F26B 19/00*** | (2006.01) |
| ***F26B 25/22*** | (2006.01) |

(52) U.S. Cl.
CPC ............. *F25D 13/00* (2013.01); *F25D 17/02* (2013.01); *F25D 29/00* (2013.01); *F26B 19/00* (2013.01); *F26B 25/225* (2013.01); *A23V 2002/00* (2013.01); *F25D 2317/04111* (2013.01); *F25D 2700/12* (2013.01)

(56) References Cited

U.S. PATENT DOCUMENTS

| | | | | | |
|---|---|---|---|---|---|
| 2,932,573 | A * | 4/1960 | Reiman | A23L 13/76 426/248 |
| 3,905,123 | A | 9/1975 | Fowler et al. | 131/303 |
| 4,105,063 | A * | 8/1978 | Bergt | F24F 11/88 165/230 |
| 4,704,805 | A | 11/1987 | Kaya et al. | 34/31 |
| 4,856,227 | A | 8/1989 | Oglevee et al. | |
| 5,069,039 | A | 12/1991 | Martin | |
| 5,299,383 | A | 4/1994 | Takakura et al. | 47/60 |
| 5,346,129 | A | 9/1994 | Shah et al. | |
| 5,675,979 | A | 10/1997 | Sha | 62/176.6 |
| 5,980,962 | A | 11/1999 | Bracken et al. | 426/241 |
| 6,223,543 | B1 | 5/2001 | Sandelman | |
| 6,427,454 | B1 | 8/2002 | West | 62/93 |
| 6,460,359 | B1 | 10/2002 | Lauwers | 62/227 |
| 6,530,160 | B1 | 3/2003 | Gookins | 34/418 |
| 6,596,330 | B1 | 7/2003 | Roser Laromaine | 426/513 |
| 6,635,295 | B1 | 10/2003 | Horigane | 426/384 |
| 6,640,818 | B1 | 11/2003 | Talisman | 134/115 R |
| 6,826,921 | B1 | 12/2004 | Uselton | 62/176.6 |
| 7,836,712 | B2 | 11/2010 | Sasao et al. | |
| 8,445,034 | B1 | 5/2013 | Coles, Jr. | 424/725 |
| 8,718,825 | B2 | 5/2014 | George | |
| 10,674,752 | B2 | 6/2020 | Sandelman | |
| 11,369,119 | B2 | 6/2022 | Sandelman | |
| 2005/0132902 | A1 | 6/2005 | D'Arcangellis et al. | |
| 2006/0040029 | A1 | 2/2006 | Gunawardens et al. | |
| 2006/0130498 | A1 | 6/2006 | Joshi et al. | 62/127 |
| 2006/0242972 | A1 | 11/2006 | Shavit | 62/150 |
| 2008/0196427 | A1 | 8/2008 | Bianchi et al. | 62/176.6 |
| 2009/0211274 | A1 | 8/2009 | Meng | 62/93 |
| 2009/0296342 | A1 | 12/2009 | Matteson et al. | 361/679.46 |
| 2010/0127089 | A1 | 5/2010 | Sakami | |
| 2010/0154452 | A1 | 6/2010 | McCann | 62/247 |
| 2010/0310736 | A1 | 12/2010 | Burke | 426/248 |
| 2012/0060526 | A1 | 3/2012 | May et al. | |
| 2014/0345307 | A1 | 11/2014 | Bagley et al. | 62/115 |
| 2015/0057812 | A1 | 2/2015 | Zhao et al. | 700/276 |
| 2017/0074538 | A1 * | 3/2017 | Marchetti | F24F 11/62 |
| 2017/0102373 | A1 | 4/2017 | Atakan et al. | |

FOREIGN PATENT DOCUMENTS

| | | | |
|---|---|---|---|
| WO | WO 97/37545 | A1 | 10/1997 |
| WO | WO 2016/004528 | A1 | 1/2016 |
| WO | WO 2018/140424 | A1 | 8/2018 |

OTHER PUBLICATIONS

EPO Communication dated Nov. 3, 2020 issued in European Application No. 18745080.4.

Written Opinion of the International Search Authority dated May 6, 2019 issued in corresponding International Application PCT/US2019/015640.

International Search Report dated May 6, 2019 issued in corresponding International Patent Application PCT/US2019/015640.

Examination Report dated Jul. 6, 2023 issued in corresponding Australian Patent Application No. 2018213191.

* cited by examiner

METHOD OF CONTROLLING THE ENVIRONMENT IN A GROW ROOM

RELATED APPLICATIONS

The present application claims priority to and incorporates by reference U.S. Application Ser. No. 63/487,476, filed Feb. 28, 2023. The present application is a continuation-in-part of U.S. application Ser. No. 17/748,109, filed May 19, 2022, which is a division of U.S. application Ser. No. 16/261,075, filed Jan. 29, 2019 (now U.S. Pat. No. 11,369,119), which claims priority to U.S. Provisional Application Ser. No. 62/625,161, filed Feb. 1, 2018, U.S. Provisional Application Ser. No. 62/721,019, filed Aug. 22, 2018, and U.S. Provisional Application Ser. No. 62/662,925, filed Apr. 26, 2018, and is a continuation-in-part application U.S. application Ser. No. 15/414,716, filed Jan. 25, 2017 (now U.S. Pat. No. 10,674,752), the contents of which applications are incorporated by this reference.

FIELD OF INVENTION

The present invention relates to a method for controlling the environment in a grow room to enhance the growing process of a plant.

BACKGROUND OF THE INVENTION

Various products require time for what is called either "aging" or "drying".

Cheeses and meats have historically been aged in caves. The local climate, geological conditions and season dictated the temperature and humidity in the caves for foods. Due to these varied conditions, different styles and types of food products come from different locations.

People are now making aged cheeses and meats of all different types, and in all locations around the world. The challenge they face is controlling/creating the proper conditions in the rooms where the product is being dried or aged. At present most facilities try to control the temperature in the room (dry bulb) and humidity (% RH) with limited success. % Relative Humidity is calculated using the Partial Vapor Pressure (ew)/Saturated Vapor Pressure (e*w)*100. The Partial Vapor Pressure changes with the Dew Point. The Saturated vapor pressure changes with the dry bulb temperature.

Conventional prior art techniques for drying and curing cannabis flowers and leaves have largely used more elementary home grown methods. Some larger facilities for drying cannabis use the above-described facilities to try to control the temperature and the humidity in a controlled space.

Vapor pressure in a room is used interchangeably with dew point but vapor pressure of a food or a plant is specific to that product and is subject to measurement. In this patent application, vapor pressure in a room and dew point of the room are used interchangeably, but dew point is never used when referring to the vapor pressure of a food or a plant since the term dew point is not used in those instances.

The drying and curing of products such as meats, cheeses, cannabis flowers and leaves (products) essentially involves removing water from the products. The amount and the rate of water removal substantially controls the quality and the desirability of the products.

Conventional HVAC systems have been used to control the climate inside of drying rooms, aging rooms and grow rooms.

A typical HVAC system controls the dry bulb temperature (or temperature) and the humidity.

To control the dry bulb temperature an On/Off thermostat may be used, while a humidistat may be used to control the moisture in the room. While the temperature and the humidity affect one another, a typical HVAC system controls these parameters separately.

In a typical HVAC system, in response to the temperature higher than the set temperature, the thermostat calls for cooling, and activates the DX (direct expansion) cooling system. The cooling coil of the cooling system will then cool to the set temperature based on the suction pressure of the compressor, which is typically 25° F. to 32° F. The cooling system will run until the dry bulb temperature is pulled down to a point that satisfies the set point temperature. During the cooling period, water in the air will be removed as a function of the cooling coil temperature as long as the air's dew point is above the cooling coil's temperature. However, the thermostat only controls the dry bulb temperature with no regard to the vapor pressure (dew point) in the cooled space. A low relative humidity state in the space may cause the humidistat to activate a humidifier to add moisture into the space. The amount of water that is added is a function of the relative humidity and not the absolute amount of water.

In a room that is climate-controlled by a conventional HVAC system, as the dry bulb air temperature moves up and down within the controlling range of the dry bulb thermostat, the relative humidity will fluctuate based on the dry bulb temperature, causing the humidistat to chase the fluctuating relative humidity caused by the fluctuating dry bulb temperature. The humidistat will either turn on a dehumidifier to extract moisture from the air if the humidity is too high or will turn on a humidifier if the humidity is too low. In a grow room that uses a conventional HVAC for climate control, the humidistat may operate the cooling coil(s) to cool the air in order to remove excessive moisture. While the humidistat in a typical grow room has the cooling system activated to reduce the relative humidity in the space, the space may become too cool and the dry bulb thermostat will activate a heating system to re-heat the air leaving the cooling coil in order to keep the dry bulb temperature within the specific control range. The addition of heat to the air causes the relative humidity of the air to fall, which will cause the humidistat to respond by turning off the cooling coil once it sees that the target relative humidity has been reached. It should be noted that adding heat to the air cannot change the vapor pressure of the air; it only changes the relative humidity of the air which does not achieve a stable vapor environment. Consequently, conventional HVAC system controls are inherently unstable in maintaining constant vapor pressure, a critical factor in aging, curing and drying products, and as discussed below an important factor in growing plants. The instability is caused by the interaction of the dry bulb affecting the relative humidity. When the dry bulb thermostat calls for cooling, the cooling coil's temperature drops from the ambient temperature to somewhere near the suction temperature which is typically in the high 20° F.'s to low 30° F.'s. This causes the vapor pressure at the cooling coil to drop almost immediately affecting the vapor pressure throughout the room (Boyle's Law), which is undesirable when trying to maintain a constant vapor pressure in the space for a given drying process.

SUMMARY OF THE INVENTION

A method according to the present invention materially improves the process for growing cannabis or other plants.

As explained above maintaining constant vapor pressure in a controlled environment cannot be achieved by conventional methods using dry bulb thermostats and humidistats, where the dry bulb thermostat controls the heating and cooling, and a humidistat compensates for excessive removal of water from the air by adding back water by means of a humidifier.

Relative humidity, which is what a humidistat controls, is defined by two variables, the dry bulb temperature and vapor pressure (dew point). If either changes, so does the relative humidity. Controlling relative humidity does not provide a means of maintaining constant vapor pressure. Vapor pressure control requires controlling the absolute amount of water in the air.

U.S. Pat. No. 11,369,119 discloses a system for drying and curing products such as meats, fruits, cheeses, cannabis, and so on.

In a method according to the present invention, the system disclosed in U.S. Pat. No. 11,369,119 is employed in growing cannabis or other plants.

DETAILED DESCRIPTION

Figure 1:
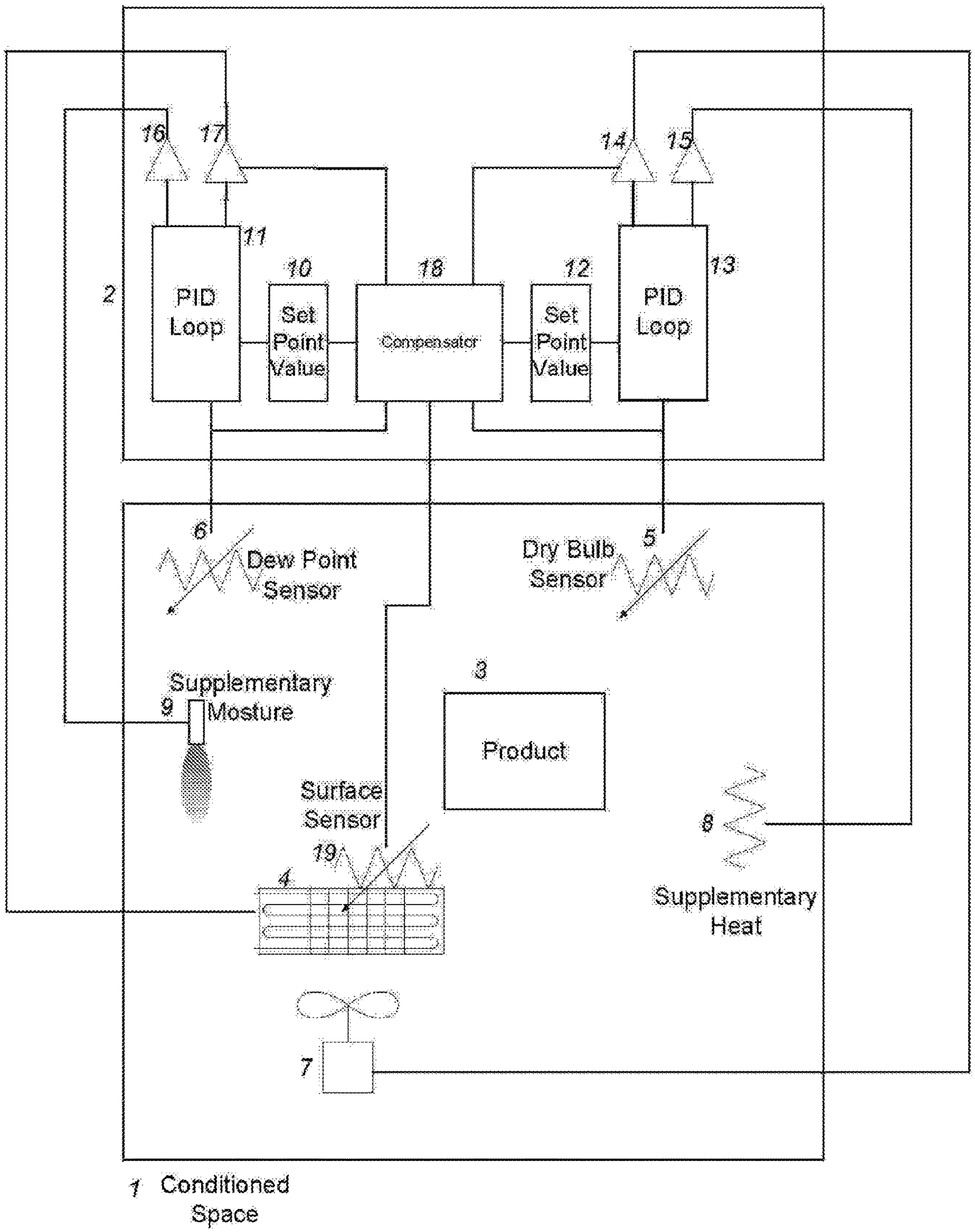
FIG. 1 is a block diagram of a control system of this invention.
Figure 3:
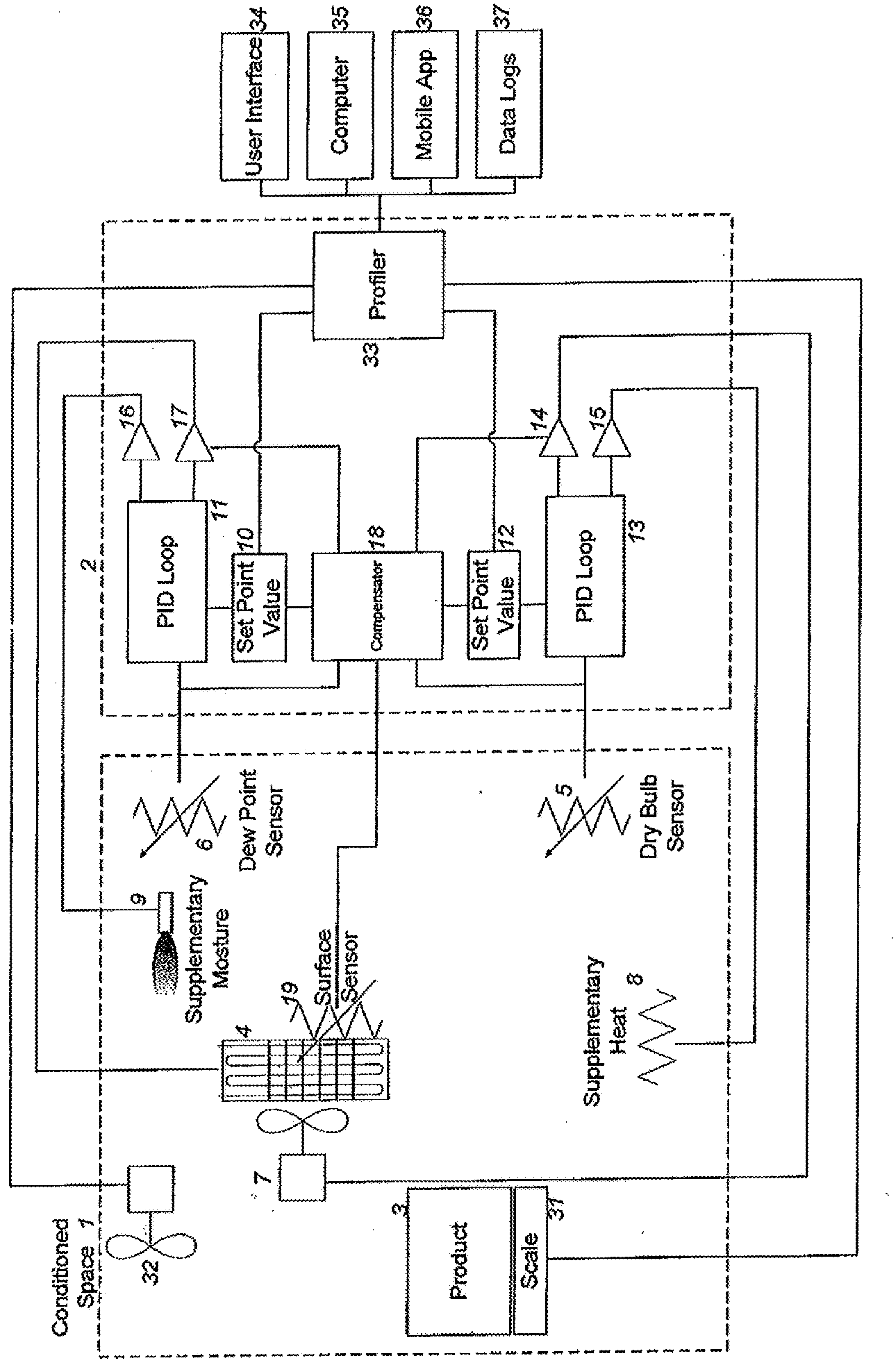
FIG. 3 is a block diagram of a control system of this invention as applied to cannabis flowers with the blocks in FIG. 1 having the same number where appropriate as in FIG. 3.

FIGS. 1 and 3 are system block diagrams and use the same reference numbers where appropriate for using the control system for cannabis.

The controlled and conditioned space or aging room is shown as conditioned space 1. Within the conditioned space 1 is the product 3. Also inside the conditioned space 1 is a cooling coil 4. The cooling coil 4 can have, but is not limited to means of cooling by liquids, such as chilled water, or liquids that are evaporated in the coil, such as refrigerants. The configuration of the cooling coil 4 can be in the form of pipes with fins, just pipes, or cooled surface areas. When the surface temperature of the cooling coil 4 is above the dew point of the air in conditioned space 1, the cooling coil 4 is limited to removing the sensible heat from the conditioned space 1. When the surface temperature of the cooling coil 4 is below the dew point of the air in the conditioned space 1, the cooling coil 4 will both remove sensible heat, and latent heat from the conditioned space 1.

The act of removing latent heat from the conditioned space 1 causes condensation to form on the cooling coil 4, thereby removing water vapor from the air. Removal of water vapor from the air in the conditioned space 1 reduces the vapor pressure of the conditioned space 1. The cooling coil's sensible and latent capacities are a function of the coil size (heat transfer area), coil temperature and air velocity across the cooling coil's surface. The ratio of sensible and latent heat capacities of the cooling coil 4 can be changed by varying the temperature of the cooling coil 4 and the air velocity across the cooling coil 4. As the air velocity increases across the cooling coil 4, the sensible heat capacity goes up when the cooling coil 4 is above the dew point. As the air velocity decreases and the cooling coil 4 is below the dew point in the conditioned space 1, the latent to sensible ratio goes up, increasing the latent cooling capacity, and thereby increasing the amount of water removed from the air.

The control system 2 monitors the dry bulb temperature in the conditioned space 1 with a dry bulb sensor 5. The control system 2 also monitors the dew point in the conditioned space 1 with a dew point sensor 6. The measured values are communicated by the sensors from the conditioned space to the control system 2. The desired dry bulb and dew point conditions are set in the control system 2 via a user interface. With the use of a psychometric chart or equation, and the choice of dry bulb and dew point set points, the user can select the desired relative humidity in the conditioned space 1.

The dry bulb set point is set point value 12, and the dew point set point is set point value 10. There are two independent PID control loops. PID stands for a feedback loop which has proportional integrative and derivate properties. PID control loops are either hardware, software, algorithms or combinations thereof.

PID control loop 13 uses the dry bulb sensor 5 value and the dry bulb set point value 12 to calculate an error value. The error value is used to control the flow of air across the cooling coil 4. The air flow across the cooling coil 4 can be controlled by the speed of a fan or the position of a damper that steers the flow of air across the cooling coil 4. As the dry bulb temperature of the conditioned space 1 increases above the desired dry bulb set point 12, a positive error is created, and the speed of the air flow will be increased so that the sensible cooling capacity of the cooling coil 4 is increased, thereby increasing the removal of sensible heat from the conditioned space 1. As the dry bulb temperature of the conditioned space 1 decreases and approaches the desired dry bulb set point 12, the speed of the air flow is decreased, so that the sensible cooling capacity of the cooling coil 4 is reduced.

If the dry bulb temperature of the conditioned space 1 continues to fall below the desired dry bulb set point 12, a negative error is created, and a source of supplementary heat 8, located in the conditioned space 1, would be turned on. As the negative error between the desired dry bulb set point 12 and the dry bulb sensor 5 increases, the output to the supplementary heat is increased. The supplementary heat 8 may be controlled in either an On/Off mode, with a temperature differential between on and off, or in a proportional mode where the output of the supplementary heat 8 is variable.

PID control loop 11 uses the dew point sensor 6 value and the dew point set point value 10 to calculate an error value that is used to control the temperature of the coiling coil 4.

The temperature of the cooling coil 4 can be changed by controlling the position of a valve that regulates the flow of cooling liquid that is allowed to flow into the cooling coils recirculation loop. Or in an evaporative cooling coil, an adjustable valve is placed on the discharge, or low pressure side of the coil, also referred to as the suction side. Varying the flow capacity of this valve will vary the pressure on the suction side of the evaporator coil, which controls the temperature at which the refrigerant evaporates, thereby allowing the control of the temperature of the cooling coil 4.

As the dew point temperature of the conditioned space 1 increases above the desired dew point set point 10, a positive error is created and the temperature of the cooling coil 4 will be reduced. Reducing the temperature of the cooling coil 4 increases the coil's latent capacity, and thereby removes more water from the air and reduces the dew point in the conditioned space 1. As the dew point temperature of the conditioned space 1 decreases and approaches the desired dew point set point 10, the temperature of the cooling coil 4 is increased, so that the latent cooling capacity of the cooling coil is reduced.

If the dew point temperature of the conditioned space 1 continues to fall below the desired dew point set point 10, a negative error is created and a source of supplementary moisture 9 located in the conditioned space 1 is turned on. As the negative error between the desired dew point set point 10 and the dew point sensor 6 increases the output to the supplementary moisture 9 is increased. The supplementary moisture 9 may be controlled in either an On/Off mode with a temperature differential between on and off, or in a proportional mode where the output of the supplementary moisture 9 is variable.

While the above control strategy works well when the dew point in the conditioned space 1 causes a positive error, which in turn, causes the cooling coil 4 to be below the dew point in the room, and the dry bulb temperature in the conditioned space 1 to also have a positive error, the dry bulb temperature of the room can be brought down to the desired set point. A problem occurs when the dew point error is at or close to 0, and the cooling coil is no longer being cooled, and there is no need to further reduce the dew point in the conditioned space 1 and, the dry bulb temperature of the conditioned space 1 is above the set point, causing a positive dry bulb error. At this point, increasing the flow of air across the cooling coil 4 which has limited or no sensible capacity, caused by the small dew point error value, will maintain the conditioned space 1 above the desired dry bulb set point. By introducing a sensor on the surface of the cooling coil 4, surface sensor 19, the surface temperature of the cooling coil can now be communicated to the control system 2. When the compensator 18 sees that the value of the dew point sensor 6 and the dew point set point value 10 are relatively close, meaning the control is maintaining the dew point set point, and there is a relatively large positive error between the dry bulb sensor 5 and the dry bulb set point value 12, the control compensator 18 will provide bias to the output signal that is coming out of the dew point PID control loop 11. This will cause the cooling coil 4 to be lower in temperature, thereby increasing the coil's sensible capacity and reducing the conditioned space 1 dry bulb temperature. The surface sensor 19 monitors the temperature of the cooling coil 4 and limits the temperature of the cooling coil 4 just above the desired dew point. This is a user adjustable value that is set as an offset to the dew point set point value 12. This offset would normally be set to a value of zero, which would mean the cooling coil 4 surface temperature is limited to the dew point set point, or positive by a value that will keep the cooling coil 4 surface temperature above the dew point set point value. Since it is a user selectable value, in some cases the user may set this value to a negative value so that the cooling coil 4 can go below the dew point setting 10 if desired. Setting the offset to 0 or a positive value will prevent the cooling coil 4 from having latent capacity, since it is at or above the dew point and the cooling coil 4 can now provide just sensible cooling to reduce the dry bulb temperature in the conditioned space 1. As the dry bulb temperature in the conditioned space 1 as measured by the dry bulb sensor 5 approaches the dry bulb set point value 12, the amount of bias applied to the dew point PID control loop 11 output is reduced. This is where the system allows an error in the dry bulb control loop to effect the output of the dew point control loop.

Figure 2:
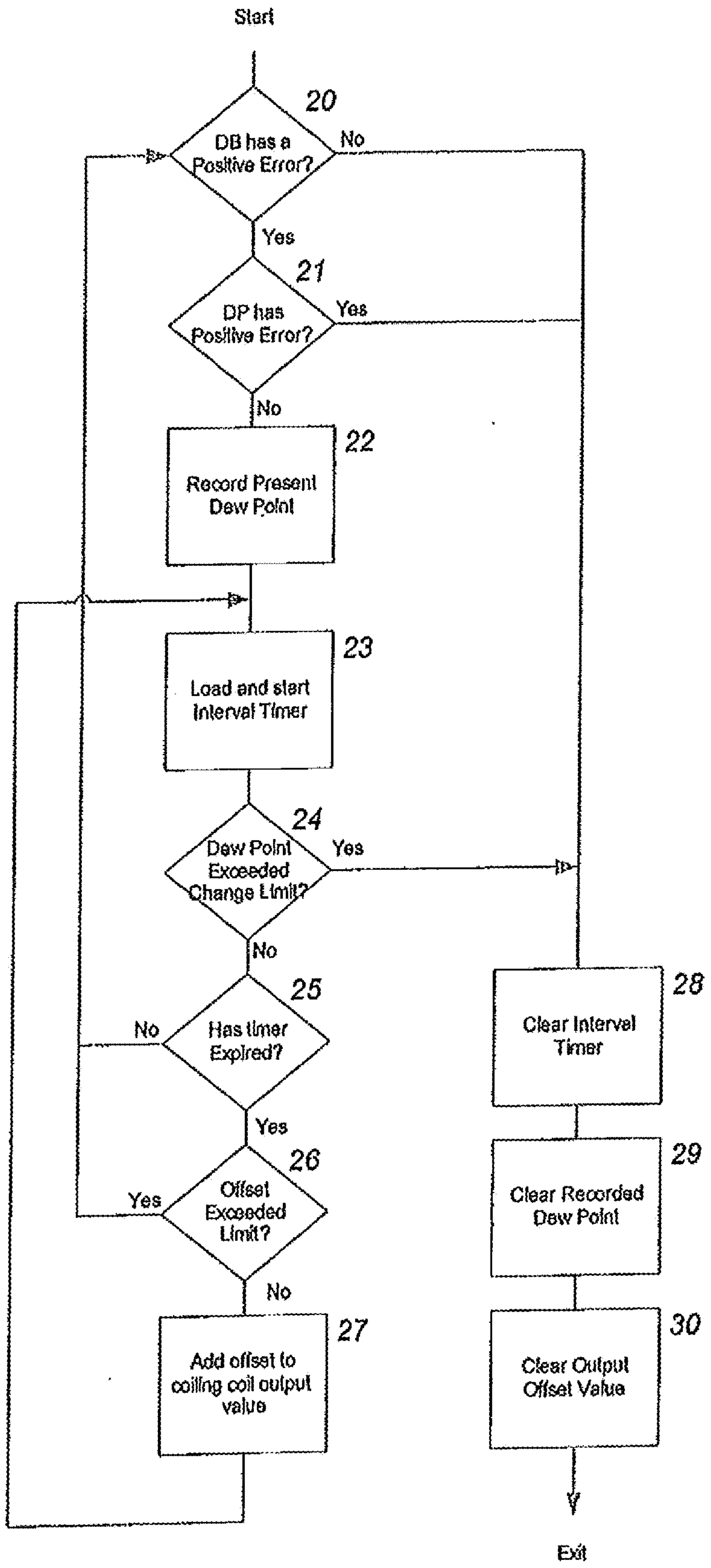
FIG. 2 is a flow chart of an alternative system to deal with certain operating issues, as described.

An alternative method to deal with the condition of a small or no latent load, while there is a sensible load, as outlined above, can also be accomplished without the use of a surface sensor 19. In this method, as shown in FIG. 2, the compensator 18 monitors if there is a positive error between the dry bulb set point 12 and the actual dry bulb as measured by dry bulb sensor 5 in the conditioned space. This decision is shown as block 20. If there is a positive error which indicates a need for sensible cooling, an additional decision as in block 21 is made to determine if there is not a positive error between the dew point set point and the actual dew point in the conditioned space 1, as sensed by the dew point sensor 6. Not having a positive error in the dew point PID control loop 11, would indicate the latent load is satisfied, and there will be little or no output to the cooling coil 4. At this point in time when these conditions are true, the present dew point in the conditioned space 1 is recorded 22 as sensed by the dew point sensor 6 in the conditioned space 1.

The timing is started at 23 with an interval timer, with a user selectable amount of time that is loaded. This interval timer periodically allows the compensator 18 to add a user selectable amount of offset to the output to the cooling coil 4, thereby reducing the temperature of the cooling coil 4. Reducing the temperature of the cooling coil 4 increases the coil's sensible capacity, in an effort to reduce the error of the dry bulb temperature of the conditioned space 1. At step 24 the dew point is monitored in the conditioned space 1 as measured by the dew point sensor 6 and is compared to the value of the dew point in the conditioned space 1 that was recorded at step 22 at the start of this process. If the dew point in the conditioned space 1 has decreased by a user selectable amount that would indicate the dew point in the conditioned space 1 is starting to drop by an unacceptable amount. At step 24 the process may be aborted, and the interval time 28, the recorded dew point 29 and the output offset value 30 cleared. The interval timer is tested at step 25 to see if additional offset can be added to the output of the cooling coil 4. This periodic interval of time allows for the thermal lags in the system to take place over time so as not to add too much cooling to the cooling coil 4 too quickly, causing the cooling coil 4 to get too cold, and thereby drying the conditioned space 1. There is also a user selectable amount that will limit the amount of offset that can be added to the output to the cooling coil 4 during this process that is tested at step 26. Once the limit is reached, no further offset is added but the output of the cooling coil 4 is left at this level, until the dew point limit is exceeded at step 24, or the dry bulb positive error has been eliminated at step 20, at which point the interval timer is cleared at step 28, the recorded dew point is cleared at step 29, and the output offset is set back to 0, at step 30. The above description applies to cheese and meat. Other systems such as hydroponic growing installations such as for bean sprouts can advantageously use this system. Other food products can also benefit from this system.

The following is a description of the novel system and method of this invention for growing and/or drying and curing cannabis flowers, or other agricultural products.

Cannabis, like cheese and cured meats, come from different climate regions in the world. The local climate has dictated the attributes that makes the product desirable for consumption. Cheddar cheese originally comes from the English village of Cheddar, while Parmegiano-Reggiano's origin is from the Provinces of Parma. An attempt to produce Cheddar in the Italian countryside, or producing Parmesan in Cheddar would in both cases turn out a very different product due to the local climate conditions which affect the raw milk used, but more importantly affect the product during the time the product goes through the aging process. On the other hand, the system described herein allows cheeses and meats to be produced independent of the locations of local climates since the relevant climatic conditions are beneficially controlled. Similarly, desirable end products of cannabis can also be produced independent of the ambient climatic conditions, since the conditions for growing and/or affecting the aging or drying processes can be controlled with the system described herein.

There are two common species of the cannabis plant, sativa, and indica. Sativa tends to be a tall and thin plant with long thin leaves, with its origin from temperate climates in areas such as Southeast Asia, Africa, and North and South America. Indica tends to be a shorter plant, and fuller than the sativa plant, with origins in more mountainous climates, such as Afghanistan and Pakistan where the plant is subject to harsher environments.

Once the cannabis plant, and the flowers of the cannabis plant reach a desired level of maturity, the plant and the flowers are harvested. The flowers are removed, and then need to be dried and cured before consumption. The different species of the cannabis flower will have different water content, and require different drying and curing regiments. Like the drying and curing processes of cheeses and meats, where the time and rate at which the water leaves the product is significant, similar factors apply to the drying and curing of cannabis. The cannabis flower is where some of the desired compounds are found such as THC, CBD, terpenes and other chemical components. When the flowers are cut from the plant, the water content in the flower will be approximately 75-80%. In order to make the flower (also known as the bud) desirable for consumption (by means of smoking/burning) the flower must be dried and cured. In the drying phase, the bulk of the water content (moisture) in the flower needs to be reduced to approximately 33% of the starting value from approximately 75-80%. The common method of removing moisture is to place the picked flowers on trays, hanging the flowers, or placing the flowers in open containers to allow the moisture in the flowers to evaporate in addition to the conversion of chlorophyll to sugars While these methods work to some degree, the rate at which the moisture and other components leave the flower is subject to either non-existent or poor control of the drying and curing environment, dependent upon where the flowers are placed during the drying and curing process. Following the drying phase, there are also beneficial desirable attributes gained as part of a curing period after the flower is dried to a target moisture content. This phase includes but is not limited to the evaporation of some additional moisture to a level of 10-15% of the initial moisture content, development of volatiles, conversion of CBG to THC that are found in the flower, as well as ongoing conversion of chlorophyll to sugars and other compounds found in the flower.

The freely available water that is in the flower (also known and measured as Water Activity $a_W$) is removed by placing the flower in an environment in which the vapor pressure is lower than that of the flower and at the target final vapor pressure of the flower. The flower will then come to equilibrium with the space, and be at the final and target $a_w$ value. Optimum results are achieved when the rate at which the water leaves the flower is properly controlled. If the water is removed too quickly, the outside of the flower can dry too quickly causing the moisture in the core of the flower to be trapped, which both produces a lower quality finished product, as well as increasing the possibility for the remaining water in the core to grow mold, and for other forms of unwanted decay to take place.

Having the flower come to equilibrium with the vapor pressure in the space in which the drying and curing process is being performed (the controlled space) will bring the flower to a desired water activity, which is less than 0.65, and preferably less than 0.6. When the water activity is below 0.65 the growth of microbes and molds are not supported.

A method according to the present invention as outlined below allows the user to control the rate at which moisture and other compounds are allowed to leave the flower during the drying stage by adjusting the vapor pressure/dew point in the controlled space. It also allows the flowers to remain in the controlled environment during the curing phase of the process, which begins once the moisture content reaches a desired water activity.

Percentage moisture (% moisture) is quantifying the total moisture content of the product. It is measured by weighing a sample of the product, then heating the sample to boil off all the moisture content of the sample. The sample is then weighed and the ratio of the before and after weights expresses the % moisture of the sample. Water Activity when at a value of 0.60 $a_w$, is an indication that there is no longer enough unbound water to support the growth of molds and microbes, thereby creating a shelf stable product. Industries that sell products by weight such as food and pharmaceuticals, use water activity as a unit of measure as indicating that the product is dry to a point of shelf stability, without removing any bound water that would reduce the eight of the product, which would impact profitability. On the other hand, industries like fire wood, dimensional lumber, hay, etc. use % moisture as a unit of measure, as these products are sold by volume and not weight, so removal of bound water will not impact their profitability.

A conventional method of drying and curing cannabis involves first placing the cannabis flowers outdoors, or in a room for a period of time, for the drying process to occur. When left outside to dry, the rate of moisture loss is uncontrolled, and is subject to the local environmental conditions and contaminants. When the flowers are placed in an unconditioned room the same issues occur. Producers of the dried flowers have tried to improve the outcome of the drying process by placing the flowers in a room, which might be controlled by standard heating and air-conditioning, and dehumidification equipment, controlled by standard comfort controls such as a room thermostat and humidistat, which does not provide sufficient control of vapor pressure, and dry bulb temperature during the drying phase of the process to achieve better results. Once the producer feels that it has achieved the optimum moisture level in the flowers, the flowers are typically placed in a closed container which begins the curing process. The closed container is typically used to reduce the rate of water loss from the flower during the curing phase of the process. When closed containers are used, they need to be periodically opened to allow unwanted gases and moisture to escape, if the flower was placed in the container with a high moisture content that is measured as an $a_w$ value of greater than $0.60a_w$. If the flower was placed in the container with a low moisture content that is measured less than an $a_w$ value of $0.60a_w$ the opening of the container may cause the flower to lose additional moisture, even further over drying the flower. This method of opening and closing containers is done with little or no control of the ambient conditions that exist outside the container, which can either let in air with a high moisture content, or let out whatever moisture content that was in the container to ambient air outside the container with a lower vapor pressure.

FIG. 3 is a block diagram of the control system described with relation to cannabis but is applicable to other products such as food products. The same reference numerals in FIG. 1 are used to designate the same elements in FIG. 3, while elements added are identified by numerals 31-37.

The disclosed invention relating to cannabis provides system 2 and a method of control that regulates the rate at which the moisture leaves the flower (product) during the drying and curing processes, by controlling the Vapor Pressure/Dew Point in the control system 2 and air flow in the conditional space drying environment 1. The control allows the user via a user interface 34 connected to the control system 2 to set targets for Vapor Pressure (Dew Point), Dry Bulb temperature and Air Flow rate values and parameters in the conditioned space where the flowers are being dried and cured. The differential vapor pressure between the room and the flower affects the rate of moisture loss from the flower to the room. To the extent the reference numerals for elements in FIG. 1 are the same as in FIG. 3, some of the description relating to FIG. 3 may be repetitive.

Figure 4:
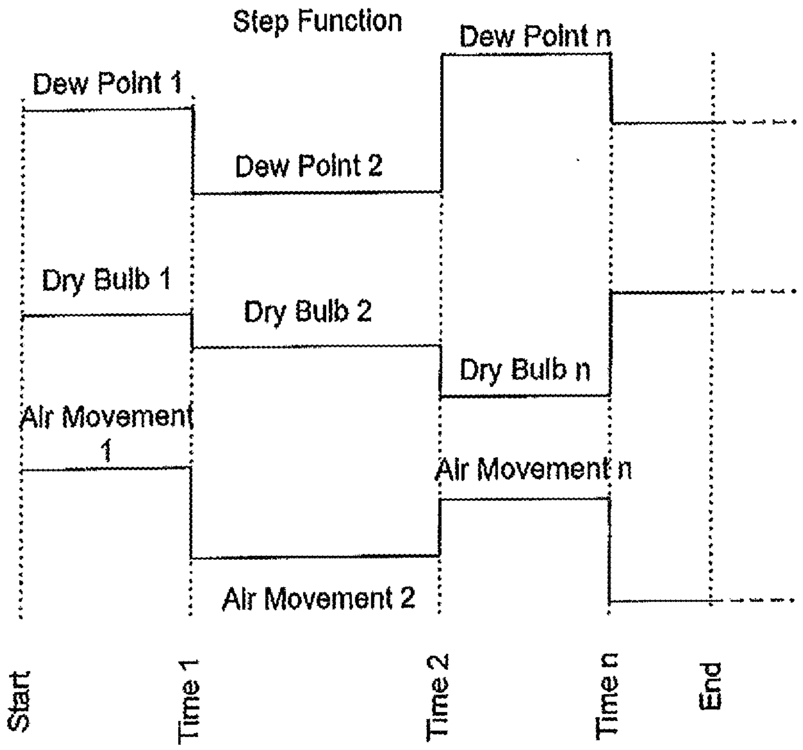
FIGS. 4-9 are flow diagrams showing the relative relationship of the various parameters being controlled.
Figure 5:
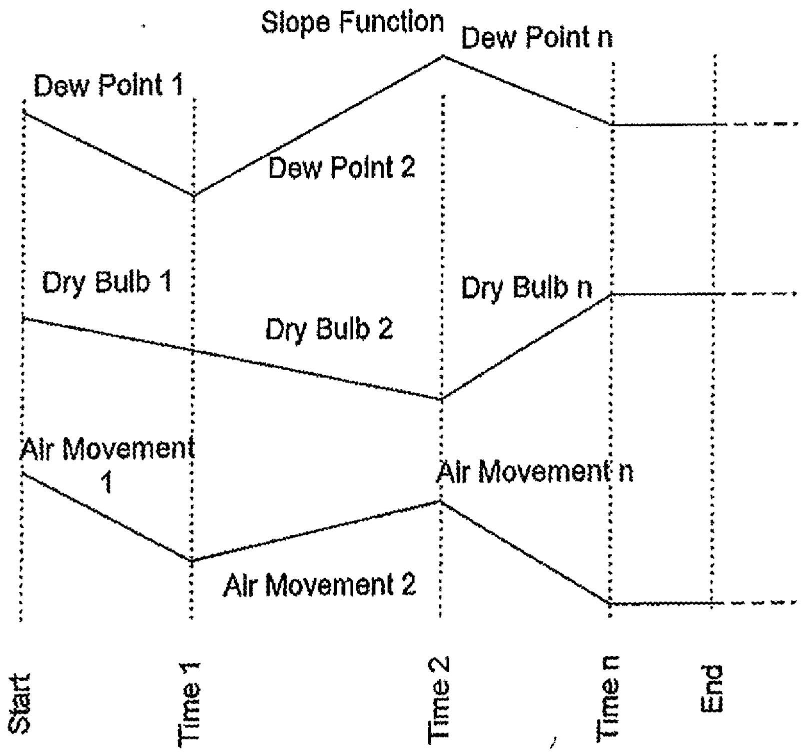
Figure 6:
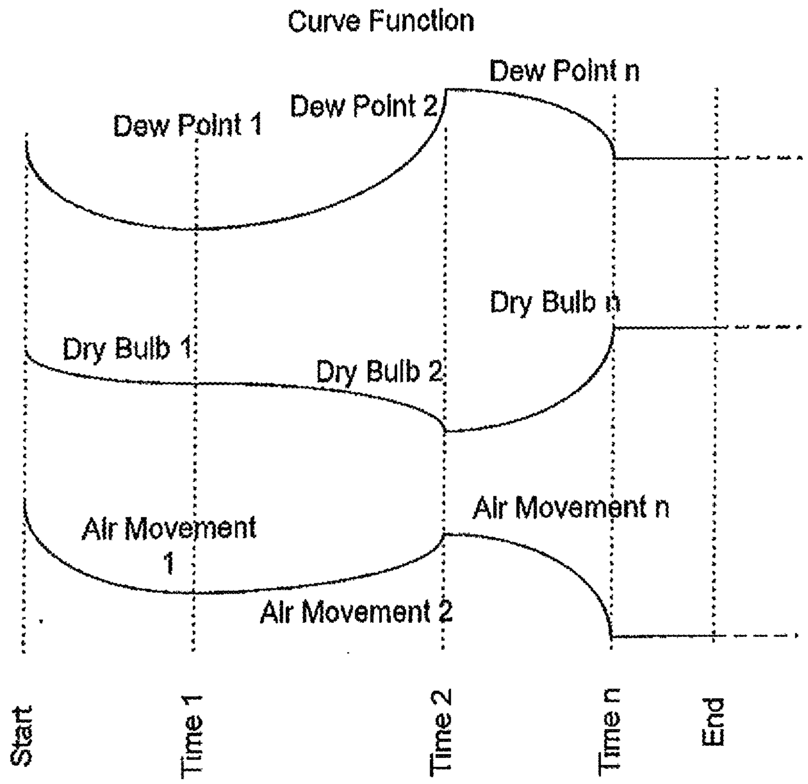
Figure 7:
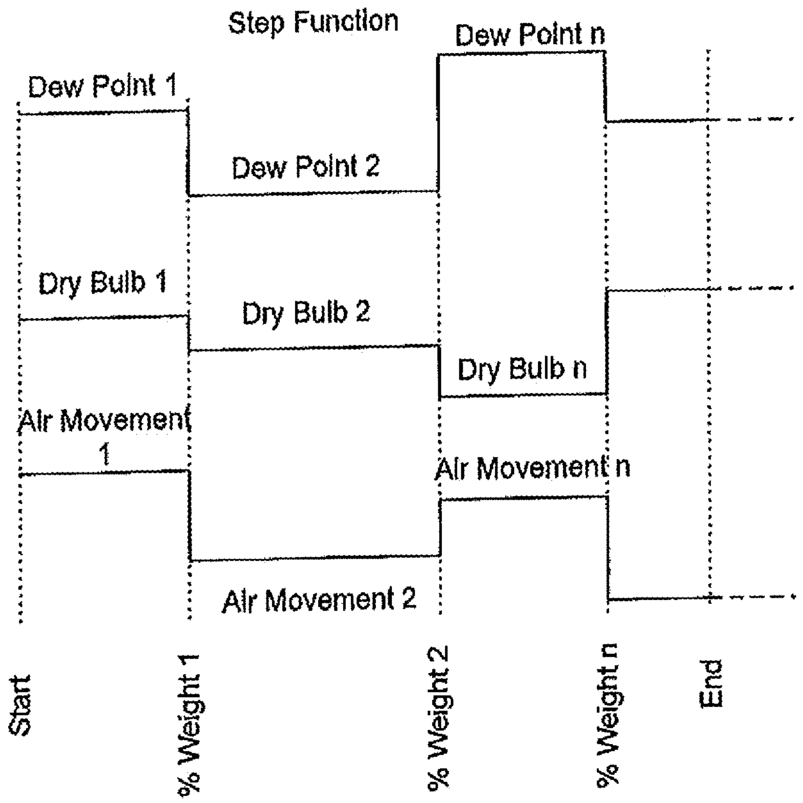
Figure 8:
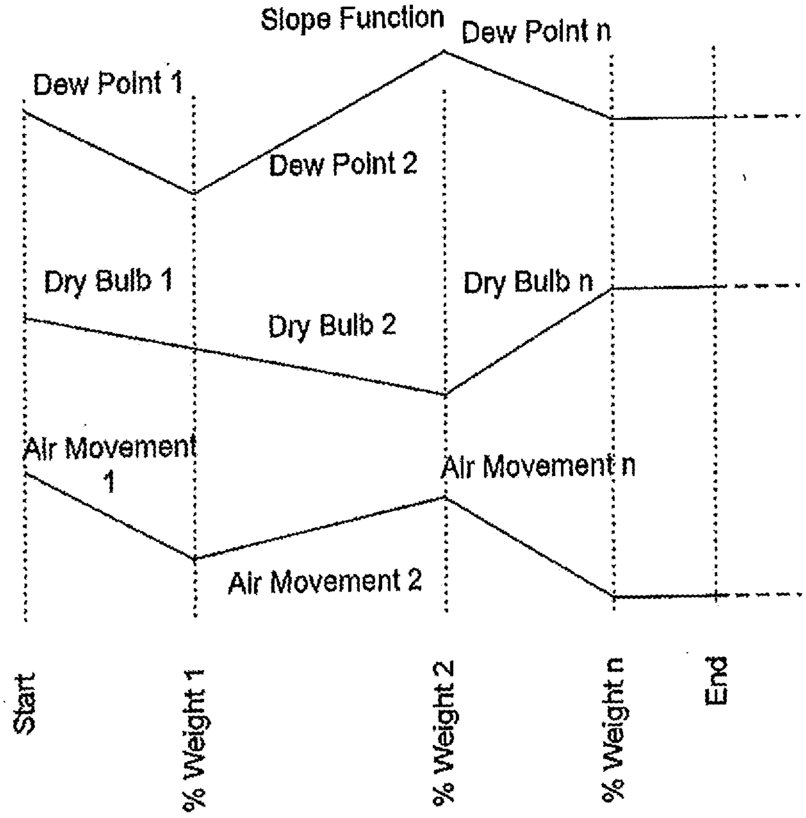

The control allows the user via a user interface 34 to set a schedule of target vapor pressures, dry bulb temperatures and air flow in the conditioned space. The amount of time the cannabis flowers remain at the various vapor pressures, dry bulb temperatures and air flows is usually for a period of days and/or weeks, but can also be set for hours. As the cannabis flower dries in accordance with the present invention, the vapor pressure, temperature and air flow in the room will be automatically adjusted after a programmed period of time (see FIGS. 6-8) to a new vapor pressure, dry bulb settings and air flow, to meet a desired or target drying rate of the flower. After a programmed period of time the profiler 33, adjusts the dew point 10 and dry bulb 12 set points and air flow rate which will cause the vapor pressure, dry bulb and air flow to adjust to new values that slow the moisture loss rate of the flower so that the curing phase can begin. By reducing the differential vapor pressure, temperature and air flow between the room and the flower, the rate of moisture loss can be slowed, and will be stopped during the curing phase when the cannabis flower reaches equilibrium with the vapor pressure in the space and will now be at the target water activity. The control allows the user to program vapor pressure (dew point), dry bulb temperature and air flow profiles, over periods of time (FIGS. 4-6). The user has the option to have the set points change as a step (FIG. 4) at the end of a time interval, or slope either as a line (FIG. 5) or curve (FIG. 6) between the starting and ending vapor pressure (dew point), and/or the dry bulb temperature and/or air flow. When the user selects the curve function, they have the ability to alter the path of the curve between the starting and ending points by setting a bias value as referenced to a straight line. The polarity of the bias value will determine if the curve starts shallow or steep, and the value between 0 and 1 will determine the magnitude of the curve from a straight line, with 0 being a straight line, and 1 being what looks like a step with a very steep rise. This allows the user to profile the conditions in the room based on a specific strain, the quality of the plant at harvest and other pre drying and curing conditions to best achieve the desired finished product.

The control system also may include a scale function, so that either a representative sample 3 of flowers/product can be placed on an electronic scale weighing mechanism 31, or the entire contents of the room can be weighed. The control system allows the user to either enter the tare weight of the containers, trays, carts or room, manually if known, or capture the tare weight of the containers, trays, carts and/or room, using the weighing mechanism 31 via the user control interface 34. Then, once the flowers are placed in the room for drying, the starting flower weight is captured by the control, via the weighing mechanism. The drying process is then started by bringing the room to a desired starting vapor pressure, dry bulb and air flow set points. The control continuously monitors the product weight, calculates the amount of weight loss, and this is displayed on the user interface 34. This allows the user to monitor and track the rate of moisture loss during the drying and curing process. The percent weight loss is also calculated and displayed.

Figure 9:
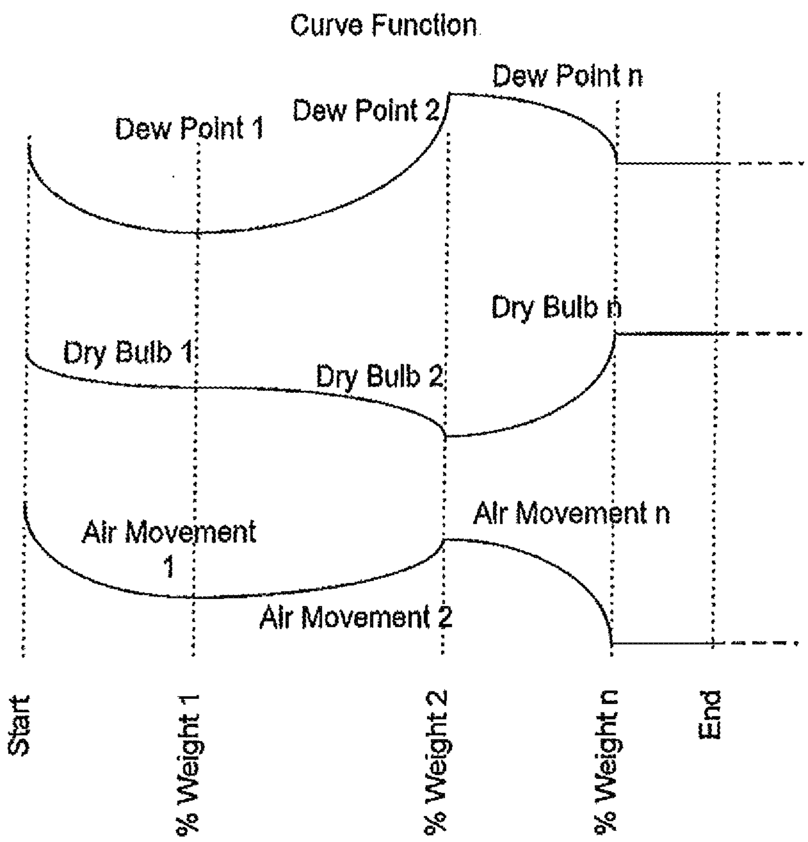

In addition to a time function causing a programmed change in vapor pressure, dry bulb temperature and air flow in the controlled room 1, a user programmed amount of percent weight loss, can cause the control to advance to the next desired vapor pressure, dry bulb temperature and air flow set points, that have been programmed into the drying and curing profiler in either a step (FIG. 7), slope (FIG. 8) or curved fashion (FIG. 9).

The control system maintains a record 37 (log) of the controlled values in the room, while also recording the weight loss of the flower. This provides the user useful information for fine tuning vapor pressure, dry bulb temperature and air flow profile to achieve the best product results.

The monitoring of values, and controlling of set points, in addition to being monitored, programmed and changed at the controls user interface 34, may also be monitored, programmed and changed from a computer 35 via a browser, or, via a mobile App 36 on a hand held device.

The above method and systems described are complete environmental and climate controls for meats, cheese, cannabis and other food products requiring drying and curing.

By controlling the entirety of the environment in an effective fashion as described above, the new and novel system allows controls to be implemented so that processes which can be accelerated can be investigated to compare results according to stored data to be able to increase the effectiveness, desirability, taste and overall quality of the product being dried and cured.

Various conditions in the control system can be changed and preferred combinations can be produced which will result in an end product having the best qualities in the best time being produced anywhere in the world without regard to the ambient environmental local conditions.

Figure 10:
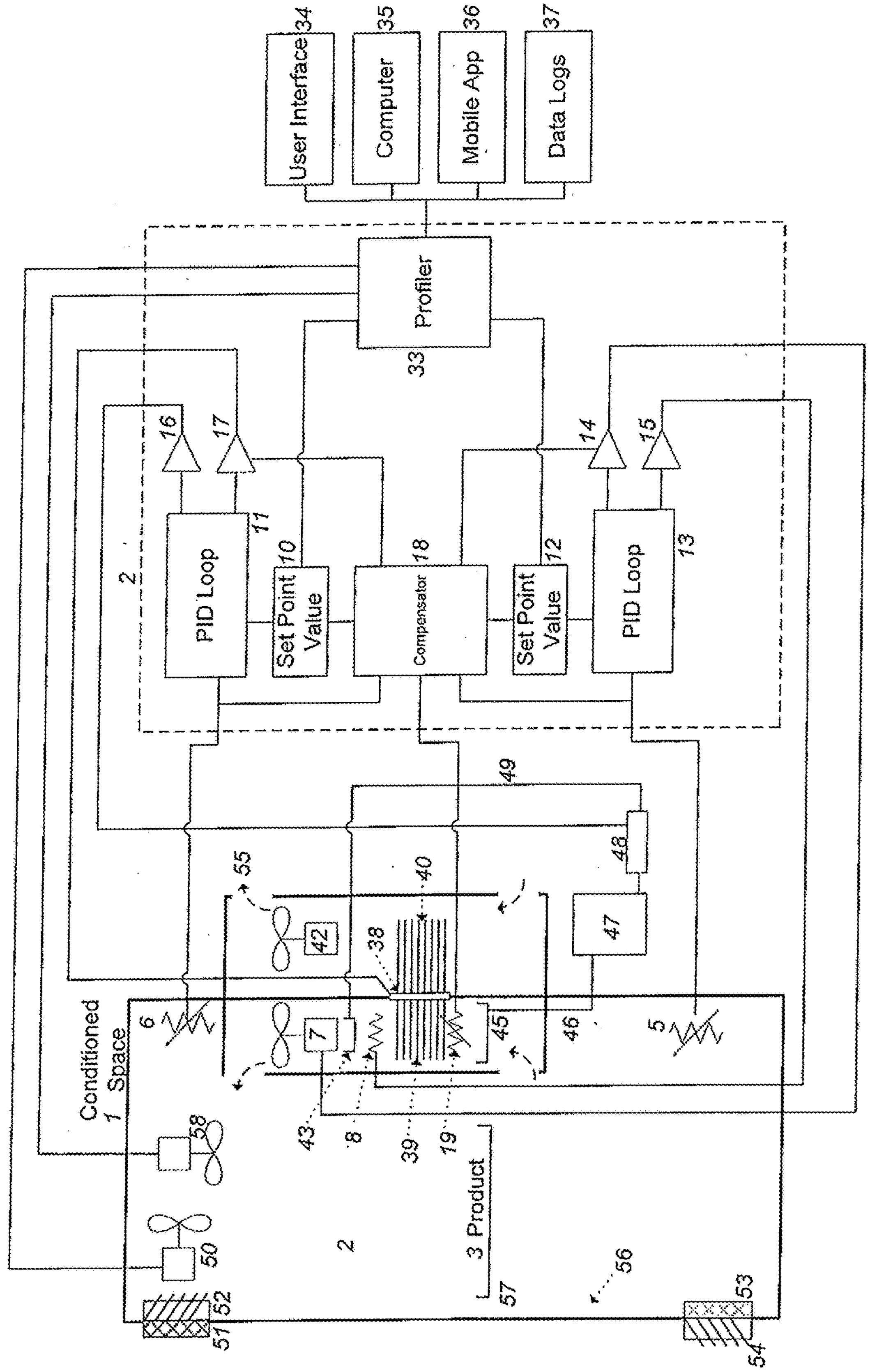
FIG. 10 is a block diagram similar to FIGS. 1 and 3 but using a Thermoelectric Cooler in the system of FIG. 3.

The invention as outlined below and as shown in FIG. 10 uses a Thermoelectric Cooler (TEC) also called a Peltier device as an alternative to other means of cooling, derived from the direct expansion of a refrigerant (DX). Use of a TEC reduces the number of mechanical components, weight and cost as compared to a DX system. The use of a TEC is best suited for small table top drying and curing system that allows the user to control the rate at which moisture and other compounds are allowed to leave the flower during the drying stage. It also allows the flowers to remain in the controlled environment during the curing phase of the process, which begins once the moisture content reaches a desired level, and comes to equilibrium with the space.

A system and a method described herein can implement drying and curing, and also long-term storage of the cured product, since the cured product can be maintained at the correct vapor pressure and will not over dry. Furthermore, the product so stored will not support the growth of mold and microbes because the water activity is maintained at the correct level, where the level of unbound water is maintained at a level so mold and microbes are not supported. The disclosed modified system as shown in FIG. 10 provides a method of control, that regulates the rate at which the moisture leaves the flower (product) 3 during the drying, curing and storage processes, by controlling the Vapor Pressure/Dew Point and air flow 58 in the drying environment 1. The flowers referred to as product 3, are placed on drying trays 57, and then placed in the drying cabinet, which is referred to as the conditioned space 1. The control allows the user via a user interface 34 connected to the control to set a desired Vapor Pressure (Dew Point), Dry Bulb temperature and Air Flow rate in the conditioned space 1 where the flowers are being dried, cured and stored. For ease of use there may be included pre-programed sets of values that the user can select. The differential vapor pressure between the conditioned space 1 and the flower 3 affects the rate of moisture loss from the flower 3 to the conditioned space 1.

A thermoelectric cooler (TEC) 38 is placed in the wall of an insulated cabinet 56. When a voltage is placed across the terminals of the TEC, one side of the device rises in temperature as the other side falls in temperature. The amount of power applied determines the amount of energy transfer between the two sides of the TEC. Reversing the polarity reverses the flow of heat between the two sides, thereby reversing the hot and cold sides. As the difference between the desired dew point, set point value 10 and the actual dew point as measured by the dew point sensor 6 increases, where the measured dew point is greater than the set point value 10, a voltage proportional to the error will be output from amplifier 17 and fed to the TEC 38. As the error increases, the voltage across the TEC 38 will go up, causing the heat sink 39 on the inside of the conditioned space to go down in temperature, and the heat sink 40 on the outside of the conditioned space to go up. As the temperature of the heat sink 39 on the inside of the conditioned space 1 goes down, at the point when the surface temperature reaches the dew point of the air in the conditioned space 1, water will start to condense on the heat sink 39. As the beads of water coalesce on the heat sink 39, they will fall and be collected into a condensate pan 45. The condensed water will then travel through a tube 46 and into a collection reservoir 47. As the water vapor in the conditioned space 1 condenses on the heat sink 39, the vapor pressure in the conditioned space 1 will be reduced and sensed as the measured dew point by the dew point sensor in the space 1. The lowering of the measured dew point in the space will reduce the error between it, and the dew point set point value 10, thereby causing the output error value on the output amplifier 17 to reduce the power being sent to the TEC 38 thereby reducing its cooling capacity, and reducing the amount of water that is condensed. In time, the PID control loop 11 will establish a stable vapor pressure in the conditioned space 1 by maintaining the controlled dew point at the dew point set point value 10. Only when a positive error condition occurs, where the measure dew point in the controlled space 1 is greater than the dew point set point 10 will a positive voltage be applied to the TEC. If the measured dew point is lower than the set point dew point 10, this would indicate additional moisture needs to be added to the conditioned space 1. This negative condition will cause the PID control Loop 11 to output a signal to amplifier 16 which will control a pump 48 that will pump water from the condensate collection tank 47 through a tube 49 to a pan 43 where the water will be allowed to evaporate and thereby increase the dew point in the conditioned space 1. Once the measured dew point reaches the value of the dew point set point, the PID control Loop 11 will be satisfied, and the output of amplifier 16 will be 0, so the pump 48 will be off. A wet sponge that is periodically moistened could be used as a source of water vapor along with or instead of the controlled arrangement described above.

When the measured dry bulb temperature in the conditioned space 1 is higher than the set point value 12 of the conditioned space 1, a positive error value will be output from the PID control loop 13 to the output amplifier 14, which drives the speed of fan 7 that is passing air from the conditioned space 1 over the cooling heat sink 39. The higher the air velocity caused by the fan 7 the greater the sensible cooling capacity will be to drive the temperature of the conditioned space lower. When the conditioned space 1 has a lower measured temperature than the set point value 12, a negative error will result in the PID control loop 13, causing a voltage on the output of amplifier 15, which will cause the heater 8 in the conditioned space to get warm and thereby heat the conditioned space. The output of the heater 8 will be reduced as the sensed temperature approaches the desired set point. During the heating period the air circulation fan 7 in the conditioned space 1 may be modulated by the compensator 18, which can inject an offset into the output amplifier 14 that drives the fan 7 to provide additional air movement if required. Whenever the TEC 38 is active, a cooling fan 42 runs to remove the heat from the TEC heat sink 40, to the ambient air 55 outside the insulated cabinet 56. By controlling the cold temperature of the heat sink 39 as a function of the dew point in the conditioned space 1, the vapor pressure is thereby controlled as a function of the latent capacity of the heat sink 39 as its surface temperature varies. By controlling the rate at which the air moves over the heat sink 39 as a function of the dry bulb in the conditioned space 1, the dry bulb temperature is thereby controlled as a function of the sensible capacity of the heat sink 39.

When the desired vapor pressure as measured by the dew point sensor 6 is at the dew point set point 10, there is no need for additional moisture removal, and the output of amplifier 17 will be at 0, and thereby, the heat sink 39 will be at or near the dry bulb temperature of the conditioned space 1. If during this condition there is a need for the temperature of the conditioned space 1 to be lower, as measured by the dry bulb sensor 5 in the conditioned space 1 as compared to the dry bulb set point value 12, the fan 7 will be running as a result of this error, but no sensible cooling will be taking place since the heat sink 39 will be at the ambient temperature of the conditioned space.

When these conditions occur the compensator 18 will apply a bias to amplifier 17, causing the TEC 38 to cool the heat sink 39, thereby increasing the sensible capacity of the heat sink 39. Temperature sensor 19 which is in close communication with the heat sink 39 will provide the temperature of the heat sink 39 to the compensator 18 which will control the amount of bias to the amplifier 17 to keep the temperature of the heat sink 39 above the dew point of the air in the conditioned space 1 so that condensation will not form on the heat sink 39, thereby keeping the latent capacity of the heat sink 39 at 0, while at the same time providing sensible cooling of the heat sink 39. In this way, the dry bulb temperature of the conditioned space can be lowered without lowering the vapor pressure in the conditioned space 1.

Consistent and correct environmental conditions are critical for proper growth of numerous agricultural products. For example, tomatoes, peppers, strawberries and other fruits and vegetables can all be effectively grown in a controlled environment. Also, most medical and recreational cannabis is grown indoors in grow rooms. Growing in a controlled indoor environment allows the grower to have complete control of the growing conditions such as light, temperature, humidity, irrigation and vapor pressure deficit (VPD), which would be more variable (or uncontrollable) if grown outdoors or in a traditional greenhouse environment. Growing in a contained grow room also helps the grower to keep the plants isolated from unwanted pests and molds. In many cases flower/fruit production is dependent upon subjecting the plants to day/night (photo/non photo) light cycles, which may be accomplished year round in the controlled environment of this invention.

The inventor has found that a key factor in the proper growing of cannabis flower (or indeed other agricultural products) is the control of VPD (vapor pressure deficit, or vapor pressure difference) between the leaf of the plant and the grow room. The growers are currently faced with the challenges of keeping the temperature and humidity levels optimal during the growing and flowering/fruiting phases in an attempt to keep the VPD at the desired level. The lights that are used to provide the energy to the plants for photosynthesis produce large amounts of heat, which becomes a required sensible cooling load for mechanical cooling equipment in order to keep the plants at the optimum growing temperature. Even with the adoption of LED lights, there still is a large amount of heat generated in the grow room by lights that needs to be removed by mechanical cooling equipment.

While the lights are providing the required energy for photosynthesis to the plants, the plants also require nutrients that are delivered as a solution in water, which is taken up by the roots, and moved up through the plant, and into, and out of the leaves. The plant absorbs the nutrients along the way as required, and the water is then transpired through the leaves. The water that is transpired from the leaves to the grow room must then be removed from the air in the grow room when the humidity level in the grow room goes above the desired range. Also, excess water from the irrigation that is not absorbed by the plants' roots becomes run off, which is collected on the tables and trays, and is left to either evaporate or run to a collection containment/drain. The water that evaporates from the tables, tray and floor must also be removed from the air, when the humidity level in the room goes above the desired range.

Conventional grow rooms are typically conditioned and controlled with commercially available Heating Ventilating, Air-Conditioning (HVAC) systems using typical HVAC temperature and humidity controls. Keeping the dry bulb temperature in an acceptable range is important to the plants' health. The grower's objective is to control both the dry bulb temperature and ultimately the VPD in the growing space. They are currently using dry bulb temperature controls along with humidity controls. Conditions where the humidity level of the room is too high, can lead to the development of molds and/or fungus, or can attract pests. So the HVAC system must also maintain an acceptable level of humidity in the grow room. Proper temperature and VPD control allows for normal healthy plant transpiration.

It should be noted that humidity is made up of two independent variables, temperature and vapor pressure (dew point). So maintaining acceptable levels of humidity is not a realistic objective. The control of VPD requires the control of the absolute vapor pressure (dew point) in the growing space.

There is a challenge to having a conventional HVAC system maintain the proper conditions. When the climate in a grow room is controlled by a conventional HVAC system, the sensible load in the grow room is controlled by a thermostat that measures the dry bulb conditions in the room, and a humidistat is used to turn on supplementary de-humidifiers as required, to bring the humidity level in the room back to the desired level. Depending on the equipment sizing and conditions in the grow room, a dry bulb thermostat calling for cooling will cause the cooling coils to get cold and then cool the air passing over the coils as well as dry the air if the coil temperature is below the dew point of the air. This cooling and drying will continue until the dry bulb thermostat is satisfied, and the dry bulb temperature in the room is within acceptable limits. If not enough moisture is removed during the cooling period, additional moisture must be removed from the air with the use of a de-humidifier or by over-cooling the air, and then reheating the air as it leaves the cooling coil. As the dry bulb temperature in the grow room cycles around the dry bulb control's differential, the relative humidity (RH) level will change, even if the moisture content of the air in the room remains constant. This fluctuation in measured % RH can cause the humidistat to 'chase' what looks like a moving target causing unstable moisture levels in the grow room.

In addition, the cycling of the lights causes a condition that has a direct effect on the sensible load on the room, as well as changing the transpiration rate of the plants, affecting the measured humidity level in the room. This change in conditions must be properly responded to by the HVAC equipment and controls to maintain a correct environment for the plants, with the intended objective of controlling the VPD in the space.

The lights are typically turned on and off with the use of a time clock, and are cycled 12 hours on, and 12 hours off creating photo and non-photo periods. When the lights are turned off, the sensible load created by the lights rapidly goes to 0, and the dry bulb thermostat controlling the temperature in the grow room responds by no longer calling for the cooling system to provide cooling, as there is no longer the large sensible load generated by the lights. With the cooling coils no longer providing both sensible and latent cooling, it is then up to, if installed, the de-humidifiers to remove any excess moisture in the air, in order to bring the grow room back to the desired % RH, or have the cooling coils continue to cool the air to remove the excess moisture, and then reheat the air as it leaves the air handler. There is a transitional period when the lights have just been turned off, and plants have not yet responded to the loss of light which stops photosynthesis and transpiration processes, and the water vapor continues to move out the stomata and collects as condensation on the bottom of the leaves which can create an unwanted condition if the water is not adequately removed by evaporation. This evaporative condition is referred to as Vapor Pressure Deficit (VPD). VPD is the saturated vapor pressure at the surface of the leaf as compared to the vapor pressure in the room. The greater the difference between the saturated vapor pressure of the leaf and the room, the quicker the water vapor will leave the leaf. The smaller the difference between the saturated vapor pressure of the leaf and the room the slower the water vapor will leave the leaf. Too high a VPD will increase the uptake of water into the plant. Too low a VPD will cause the leaf and area to remain wet which will promote the growth of molds, microbes, and pests.

The disclosed inventive method provides a method of controlling the dry bulb temperature and vapor pressure in the grow room to better control VPD.

In addition to controlling the desired dry bulb and dew point (vapor pressure) in the grow room, the inventive method may also control the lighting and the irrigation in the grow room, coordinating the various systems that affect the plants' response, and the conditions created by the plants' response. By controlling the dry bulb and vapor pressure in the grow room as two independent variables during the plants' photo/non photo cycles, the desired VPD can be consistently achieved.

Figure 11:
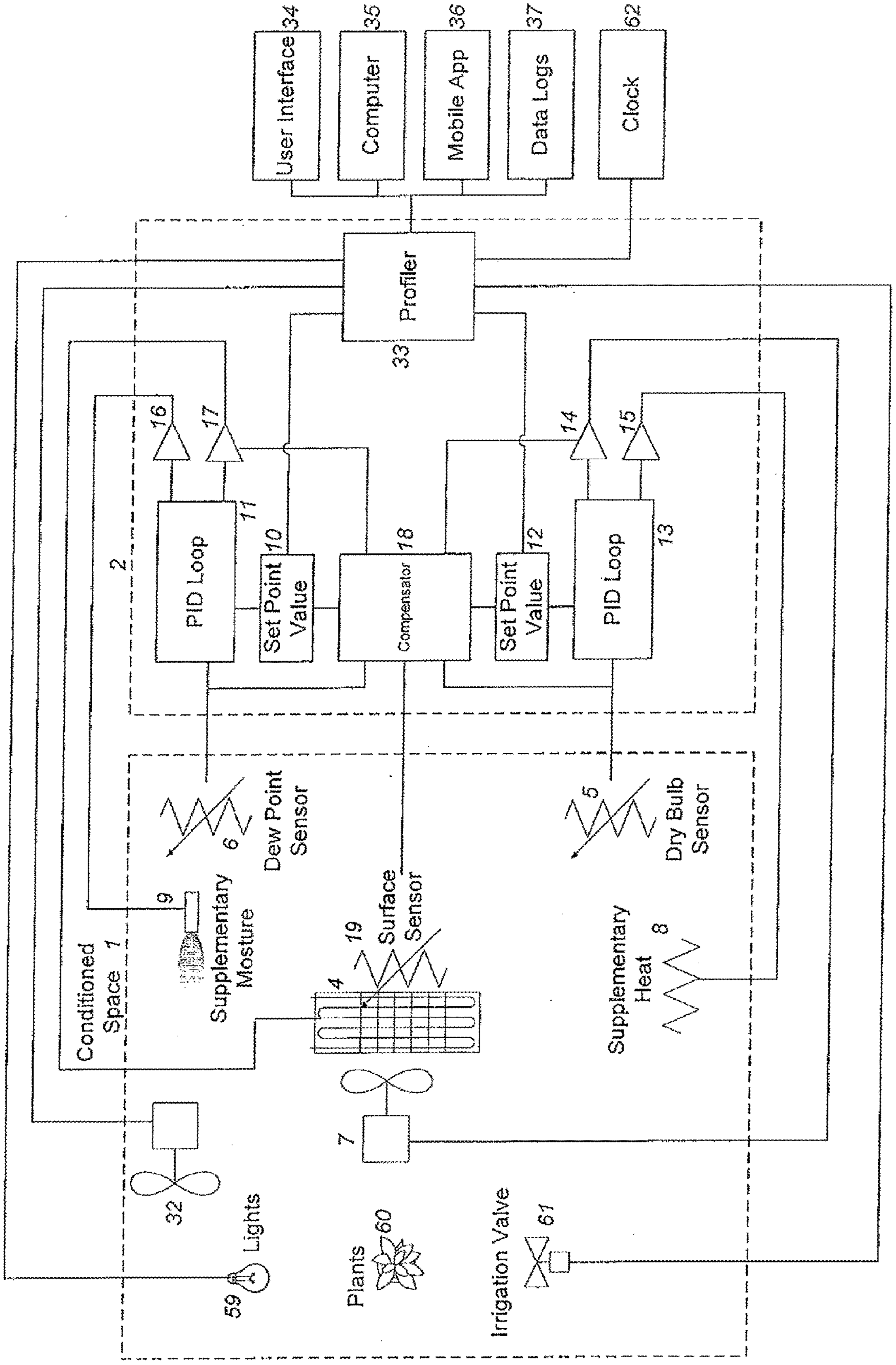
FIG. 11 is a block diagram similar to FIGS. 1, 3 and 10 and uses the same reference numerals, where appropriate and adds lighting controls.

FIG. 11 is a block diagram for a conditioned space (grow room) 1 with automated and controlled lighting. The numerals in FIG. 11 are the same as those in FIGS. 1, 3 and 10 for the same components. The grow room 1 contains the plants 60, lights 59, an irrigation valve that controls the flow of water and nutrients to the plants 61, a fan used to move air throughout the grow room 1, a temperature controlled cooling coil that is cooled either by direct expansion of a refrigerant or a chilled fluid 4, a variable speed fan 7 that moves air across the cooling coil 4, sensors that measure the dry bulb temperature 5 and dew point temperature 6, a source of supplementary heat 8, a source of supplementary moisture 9, and temperature sensor 19 in close communication with the cooling coil 4.

Further referring to FIG. 11, when the grow room 1 is used for the purpose of flowering cannabis plants, the lights 59 are turned on and off in 12 hour intervals or any other desired interval. When the lights 59 are turned off, the sensible load in the grow room 1 drops suddenly, and typical HVAC systems will require large amounts of reheat, so as not to over cool the air in the grow room when using the cooling system for primarily its latent capacity. By controlling the vapor pressure/dew point in the grow room independent of the dry bulb temperature in the room, when the lights 59 are turned off, the dry bulb sensor 5 will sense the loss of the sensible load of the lights 59, by measuring a drop in the measured dry bulb temperature in the grow room 1. This drop in temperature in the room 1 will cause the error between the dry bulb set point value 12 and the measured value by the dry bulb sensor 5, which will cause the output of a positive output error from the PID control loop 13 to reduce the output of amplifier 14, and will reduce the speed of the fan 7 that is moving air over the cooling coil 4. The reduction of air movement over the cooling coil 4 will reduce the sensible cooling of the cooling coil 4, and increase the latent cooling of the cooling coil 4. With this change in the cooling coil's 4 sensible to latent ratio, the room conditions are better maintained when there is a transition from light to dark, during the period when the plants are still in a high rate of transpiration, which requires a high level of moisture removal from the air, while the sensible load has been greatly reduced. When there is a high latent load, there is a small sensible load (when the fan 7 is off), and the cooling coil 4 starts to over cool the grow room 1 by means of convective cooling, a negative error will occur on the PID control loop 13, when the dry bulb sensor 5 is measuring a value that is below the dry bulb set point 12. This negative error will cause a value on the output of amplifier 15, which will drive the supplementary heat 8 in the grow room 1. Unlike conventional HVAC systems where the supplementary heat is placed, with regard to the air stream, after the cooling coil, in a system according to the present invention the supplementary heat 8 is placed in the growing room 1 and uses convection, that might be assisted by a fan 32 which is used to provide air movement across the plants 60. This method greatly reduces the amount of heat required as compared to conventional HVAC systems since this system is able to reduce the sensible capacity of the cooling coil 4 while raising the latent capacity of the cooling coil 4 which reduces the amount of over cooling in the grow room 1 during the conditions caused by the switching of the lights 59 from on to off.

What will further contribute to the challenge of controlling the VPD during the transition from photo to non-photo period is the desire of some growers to reduce the dry bulb temperature in the space during non-photo periods. The cooler air requires more work energy for removal of the water vapor in order to reduce the vapor pressure, since the difference in the air temperature and the cooling coil 4 temperature is reduced which reduces the cooling coils 4 sensible and latent capacities. In addition to controlling and maintaining the dry bulb and dew point temperatures in the grow room 1, the system includes a clock 62 that is used to turn the lights 59 on and off, or, by way of a dimmer; the light level will be raised and lowered over a period of time at the programmed switch intervals. The profiler 33 will contain the photo and non-photo set points, for both the dry bulb and dew point set points. When it is time to transition from photo to non-photo or non-photo to photo, the profiler 33 will either ramp, or switch the dry bulb set value 12 and the dew point set point value 10 at which the grow room 1 will be maintained. By having the ability to control the dry bulb set point 12, dew point set point, light level of the lamps 59, and irrigation 61, the conditions in the grow room 1 can be transitioned in a way that is more natural for a plant 60, enabling a method that more closely simulates the transition of the temperature, the dew point, and the light in normal outdoor transitions of the rising and the setting sun.

Figure 12:
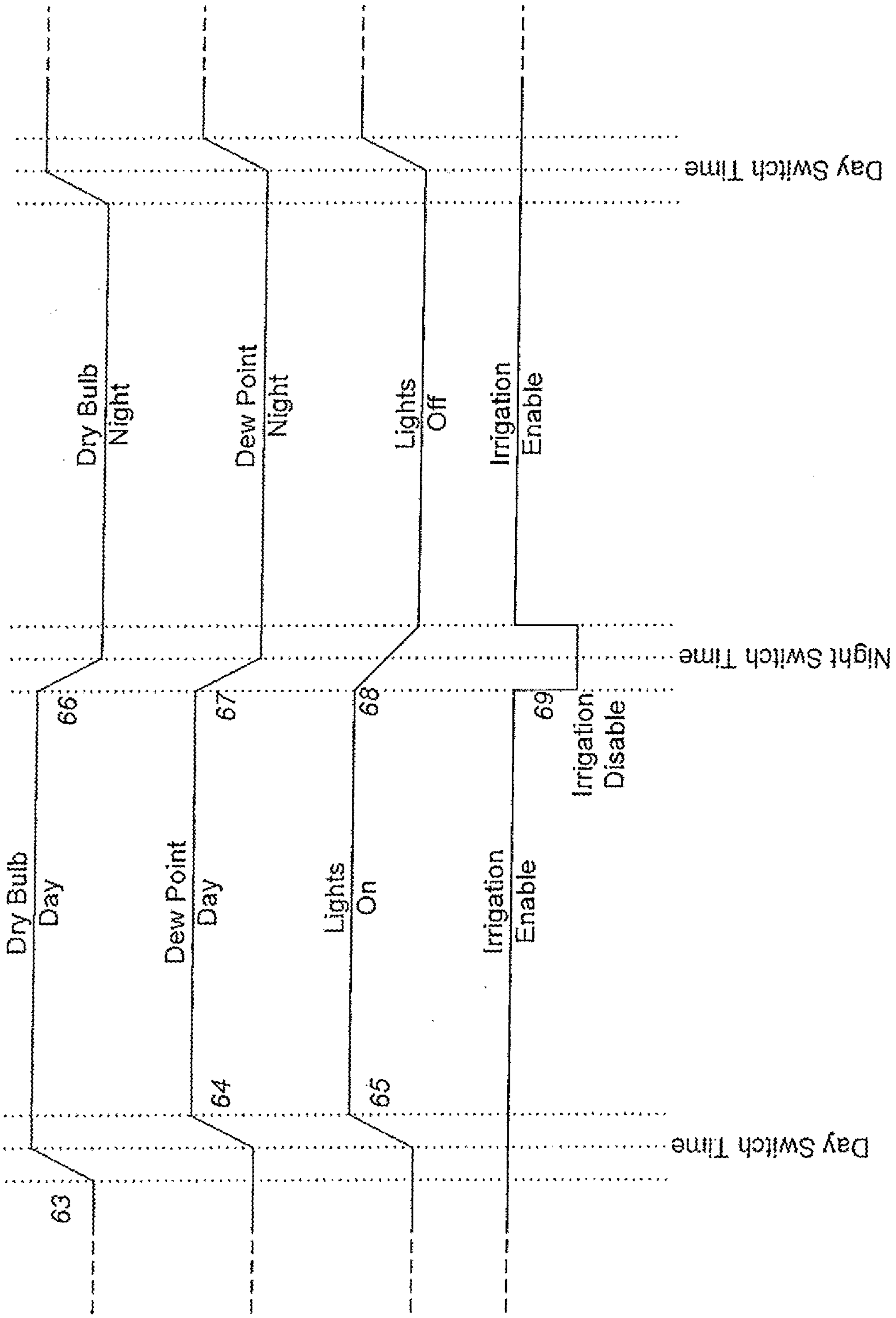
FIG. 12 is a flow diagram of the various parameters being controlled in the block diagram of FIG. 11.

The example in FIG. 12 shows how the dry bulb set point may be transitioned 63 from the prior non-photo set point to the photo set point, prior to the Photo Switch Time. The dew point set point may be transitioned 64 from non-photo to photo, starting at the Photo Switch Time, which is synchronized with the increase in light intensity 65. The amount of time prior to the time of Photo Switch Point, and after the time of Photo Switch Point, that the transition happens over, is programmed by the user, for example via the user interface 34, a computer 35, and a mobile app 36. The irrigation 61 system is also controlled, so that the amount of water and nutrients going to the plants can be reduced during the transition to better match the reduced rate of water consumption by the plants 60, as they transition from a photo to non-photo mode, reducing nutrient, water waste and overflow.

While the main objective of the invention is to control VPD, while also coordinating other factors such as lighting, irrigation, $CO_2$ levels, and others that will affect the growing of the plants, the control can also operate as a stand-alone VPD control with none, some or all of the other inputs to the plants' growth controlled by other independent systems, such as a stand-alone irrigation system, a stand-alone lighting control system, etc. That is, while it is preferable to have all of the functions coordinated in a single control system, it is not required.

Preventing the growth of fungus and molds such as *Botrytis*, Powdery Mildew and other molds and pests such as aphids, and mites on the cannabis plant is important during the cultivation of the plant.

Molds and Pests are Fond of Moisture.

Molds and fungus can grow on the cannabis plant, with the flower being highly susceptible to moisture accumulation due to its structure being densely arranged and due to the fact that cannabis leaves continuously emit water vapor. Pests also like this wet environment. Moisture can become trapped in the space between the leaves of the cannabis flower and deposited on the leaves of the flower due to condensation, which can serve as moist sites for the growth of molds, fungus and pests. It is thus important to control the difference in vapor pressure between the stomata located at underside of the leaves and the grow room's vapor pressure, so that the water vapor leaves the plant at a controlled rate. When the difference is small, there is a higher chance of higher moisture levels and condensation on the leaves. When the difference is too great, the cannabis plant may be induced to bring up too much water from the roots to compensate, which can potentially poison the plant with an increase in nutrients.

Humidity cannot be controlled as a single variable since it is made up of two variables, the dry bulb temperature and the dew point (i.e. vapor pressure, which is not to be confused with relative humidity in that relative humidity is a result of dry bulb temperature and dew point). A conventional HVAC system affects the dry bulb temperature and the dew point simultaneously (not independently). The dew point is not lowered until the dry bulb temperature of the air is cooled to the dew point. At that point, condensation will form and water will be condensed out of the air. A typical dehumidifier can also affect the dry bulb temperature and the dew point simultaneously (not independently). A typical dehumidifier moves the air across a cooling coil to bring the air temperature below the dew point, which causes condensation to remove moisture from the air and lower the dew point. The air is then passed over a heating coil to bring the air temperature back up close to the starting in-coming air temperature. The air then exits the dehumidifier in a drier state. In both cases, the operation of a typical dehumidifier is conducted on an ON/OFF basis, not a modulated basis.

The use of a conventional HVAC system to grow cannabis in a grow room is known. It is also common to use a dehumidifier with a conventional HVAC system to control the dry bulb temperature and the relative humidity (not the dew point) in a grow room. Typical growers use VPD charts with dry bulb temperature on one axis and relative humidity in the other axis, with the field of the chart containing different VPD values. A typical grower will select a desired dry bulb temperature of the room and look across the chart for the desired VPD based on the plants maturity, and then follow the chart to see what the desired relative humidity should be. The grower will then set the thermostat to a desired value for the dry bulb temperature to control the air-conditioning system which when activated will reduce both the dry bulb temperature and dew point in the space simultaneously, since that is how HVAC equipment is intended to function. The user may also set a humidistat to the desired relative humidity. When the humidistat is calling for the removal of water vapor (lower dew point) from the air, the dehumidifier(s) will be activated which will change both the vapor pressure in the grow room simultaneously with the dry bulb temperature in the grow room. These are two independent control loops that have an impact on each other. The objective of a method according to the present invention is to control the vapor pressure in the space as an independent controllable variable, and not subject to uncontrollable fluctuations as is the case with conventional HVAC systems.

In a system/method according to the present invention the dry bulb temperature and the dew point (vapor pressure) values are independently controlled, which permits controlling the VPD in a grow room.

When cannabis plants are in the photosynthesis mode, the grow lights 59 are ON in the grow room 1 (FIG. 11). Grow lights 59 contribute a large amount of sensible heat into the grow room 1 that needs to be removed with sensible cooling in order to maintain the desired dry bulb temperature in the grow room 1. At the same time, the cannabis plants are acting as little conveyors, moving water from the root system, and expelling the water out from the underside of the leaves (stomata) simultaneously taking in $CO_2$ and expelling $O_2$. Thus, latent capacity is needed to remove the water vapor from the air inside the grow room and maintain a consistent vapor pressure difference between the leaves of the plants and the grow room 1. With a system/method according to the present invention, sensible cooling and latent capacity can be adjusted independently as needed to maintain both the dry bulb temperature at a desired set point, and dew point (vapor pressure) at a desired set point in the grow room 1. A dehumidifier added to the grow room operating according to the present invention can allow for carrying a base load when the latent load is very large in order to maintain the desired dew point.

The inventor has been informed that conventional HVAC systems and conventional dehumidifiers, even when used together, struggle to perform the control of the dew point and the dry bulb temperature to maintain the set point values, and most importantly the vapor pressure difference between the plant foliage and the grow room 1. This would be expected since conventional systems try to obtain a desired VPD by controlling relative humidity, which is not a controllable variable, since it is a function of two variables, dew point and dry bulb temperature. In a grow room equipped with a conventional HVAC system and a conventional dehumidifier, the HVAC system alone may have enough sensible and latent capacity during the photosynthesis period (lights ON), and the dehumidifier typically may not be required at this time. Also, the system may lack the ability to know the saturated vapor pressure at the leaves, which makes it impossible to regulate the vapor pressure difference. However, there is poor regulation of the dew point and the dry bulb temperature because when the HVAC is running, it is affecting both the dry bulb temperature and the dew point simultaneously, without the ability to independently control each variable. When the grow room switches to the non-photosynthesis mode (lights OFF), the sensible load disappears almost instantly, the HVAC thermostat is quickly satisfied, and the HVAC system turns OFF because cooling is no longer needed. However, the cannabis plants are still actively moving water into the air in the grow room through their leaves. At this point, the conventional dehumidifier needs to be turned on to remove the water vapor, but, the dehumidifier would add heat to the grow room, which in turn causes the HVAC system to turn back on to remove the heat and the water vapor. At this point, the control loops may become unpredictable in that the added latent capacity of the HVAC may cause the dehumidifier to turn off, or the HVAC can turn OFF first after satisfying the sensible load. This is a common problem with a grow room that is equipped with a conventional HVAC system and a conventional dehumidifier(s), which does not offer control of the vapor pressure difference between the foliage and the grow room.

As explained above, grow lights are always used in a grow room, and sometimes in a greenhouse. Once the grow lights are turned off, the heat input from the grow lights stops, and the grow room starts to cool down quickly. The plants in the grow room continue to put out water that is no longer being taken up by the air in the room, since the vapor pressure at the stomata is now close to the vapor pressure in the room. That is, the moisture at the surfaces of the plants' leaves is at the saturation vapor pressure. Thus, unless the vapor pressure is reduced in the room, with the dropping of the room's temperature, the % RH in the room goes up. Consequently, chances of condensation on the leaves of the flowers of the cannabis plant in the grow room increase, which increases the risk of molds, microbes, and pests.

For clarity, it should be noted that a change in temperature does not change the dew point (vapor pressure), only the % RH. The dew point (vapor pressure) only changes once the temperature of the air drops below the dew point, at which time the room will be at saturation, and fog/rain will form, as the water is condensed out of the air.

In order to address the potential for condensation immediately after the lights are turned off, supplementary dehumidification may be applied right after the grow lights are turned off in order to extract moisture in a controlled manner (as described below) from the air in the grow room to reduce the chances of condensation of water inside and on the cannabis flowers and plants as a whole.

Figure 13:
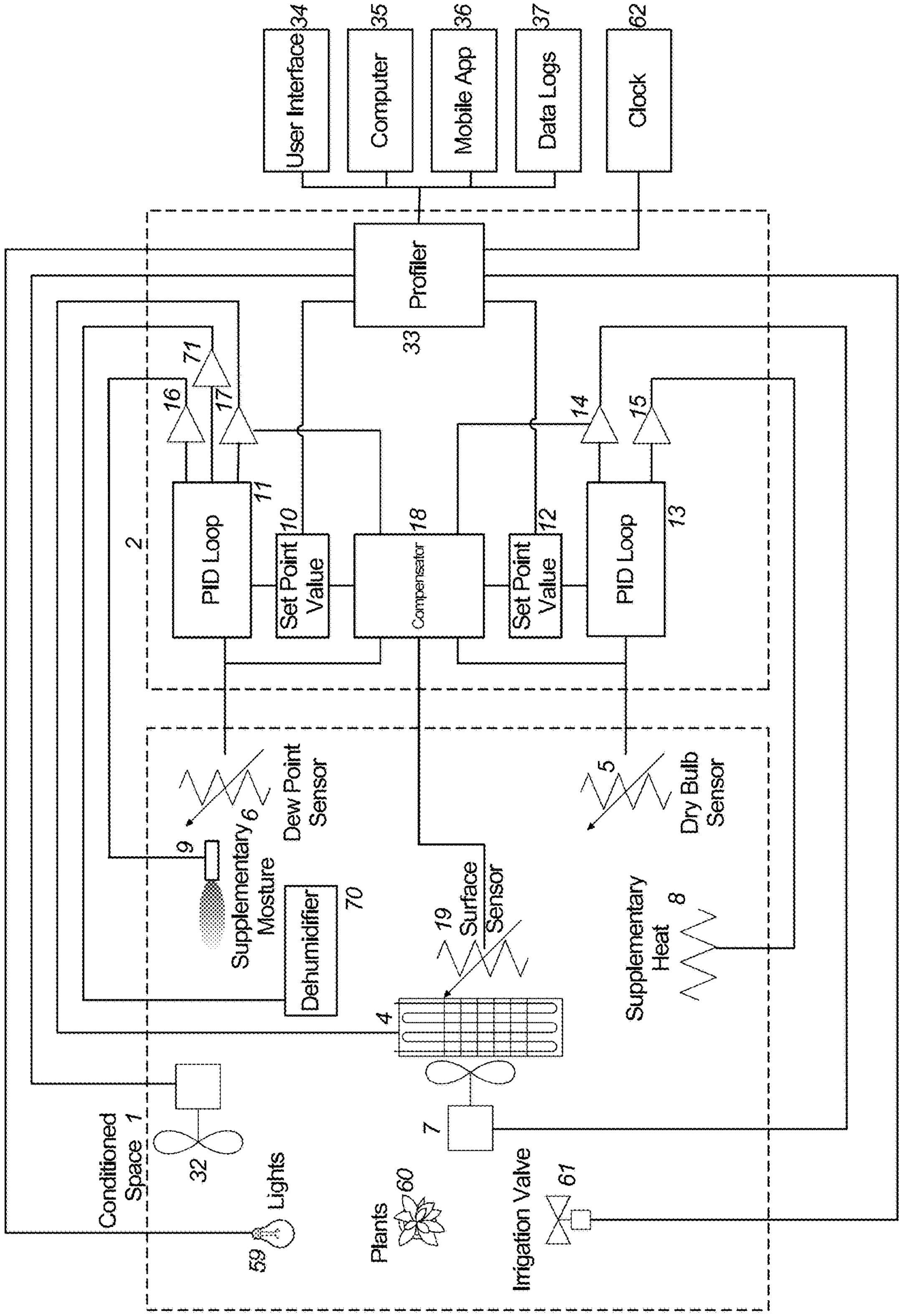
FIG. 13 is a block diagram similar to FIGS. 1, 3, 10, and 11, using the same reference numerals, where appropriate, and adding a dehumidifier.

Referring to FIG. 13, supplementary dehumidification may be implemented with a dehumidifier 70 in the conditioned space 1 (used as a grow room for growing cannabis plants) that is controlled by the PID loop 11. It is expected that the temperature of the cooling surface of the cooling coil 4 will be reduced as a function of the PID loop 11. During periods when the dew point in the conditioned space 1 exceeds the desired set point value 10, the dehumidifier 70 will be activated so that it can contribute to the process of reducing the dew point in the conditioned space 1. Once the dew point in the conditioned space 1 is brought down to a level which is user selectable, the dehumidifier 70 is disabled, and the normal operation of the system will continue to maintain the desired dry bulb set value 12 and the desired dew point set value 10.

The supplementary dehumidifier 70 may be activated by the system when the dew point in the room rises by a certain degree ("x degrees") above the set point 10, and turned off when the dew point drops by a certain degree ("y degrees") below (differential) the point at which it was turned ON. The x degrees and the y degrees may be provided to the system by the user via the user interface 34 along with the dew point set point value 10, or may be pre-programmed.

Alternatively, the supplementary dehumidifier 70 may be turned ON by the system when the control is calling for a certain percent capacity ("n % capacity") of the latent capacity output and turned OFF when the control output capacity drops by a certain percent amount ("m % capacity"). The n % capacity and the m % capacity may be provided to the system by the user via the user interface 34, or may be pre-programmed.

A main objective of the above-described method is to maintain a good, controlled grow room environment to maintain a consistent vapor pressure deficit between the leaves and the room to avoid formation of condensation on the plants in the grow room, and/or prevent the moisture level to rise to a point that allows mold, microbes, and pests to grow.

Below, another method is described to prevent high moisture levels at the plants, for example, cannabis plants, in a grow room by controlling vapor pressure deficit (VPD), which is also called vapor pressure difference, between the vapor pressure at the leaf surface and the vapor pressure in the room.

VPD is the difference between the amount of moisture in the air which can be expressed in terms of vapor pressure and the saturated vapor pressure of the underside of the leaf where the stomata are located.

The amount of moisture in the air may be measured as Dew Point, which is also the Vapor Pressure of the air in the grow room.

The amount of moisture the air can hold when it is saturated is the saturated vapor pressure, which is occurring at the leaf's surface.

The objective is to maintain the difference in vapor pressure between the grow room (by controlling the dew point in the grow room) and the vapor pressure at the leaf surface, which can be calculated based on the leaf temperature.

It has been determined that controlling the VPD is important to good plant health and growth. There are many established tables and charts that show the preferred VPD values during different phases of the plant's growth cycle. Vapor pressure is typically expressed in terms of Kilopascal (kPa) or Millibar (mb), and VPD is expressed as the difference between the leaf surface vapor pressure and the vapor pressure in the grow room. Target VPD values range from 0.4-0.8 kPa (4-8 mb) for Propagation/Early Vegetation phase, 0.8-1.2 kPa (8-12 mb) Late Vegetation/Early Flower phase, 1.2-1.6 kPa (12-16 mb) Mid/Late Flower phase.

The vapor pressure of the leaf surface can be determined by knowing the leaf surface temperature. As water vapor leaves the leaf via the stomata it is at saturation. Thus, the vapor pressure can be calculated based on the surface temperature of the leaf.

The methods described above allow for the control of both the dry bulb temperature and the dew point/vapor pressure of the grow room simultaneously, but independently to control VPD. The following describes a way of controlling the VPD by measuring the temperature of the surface of the leaf of a plant or the surfaces of the leaves of the plants in the grow room.

Figure 14:
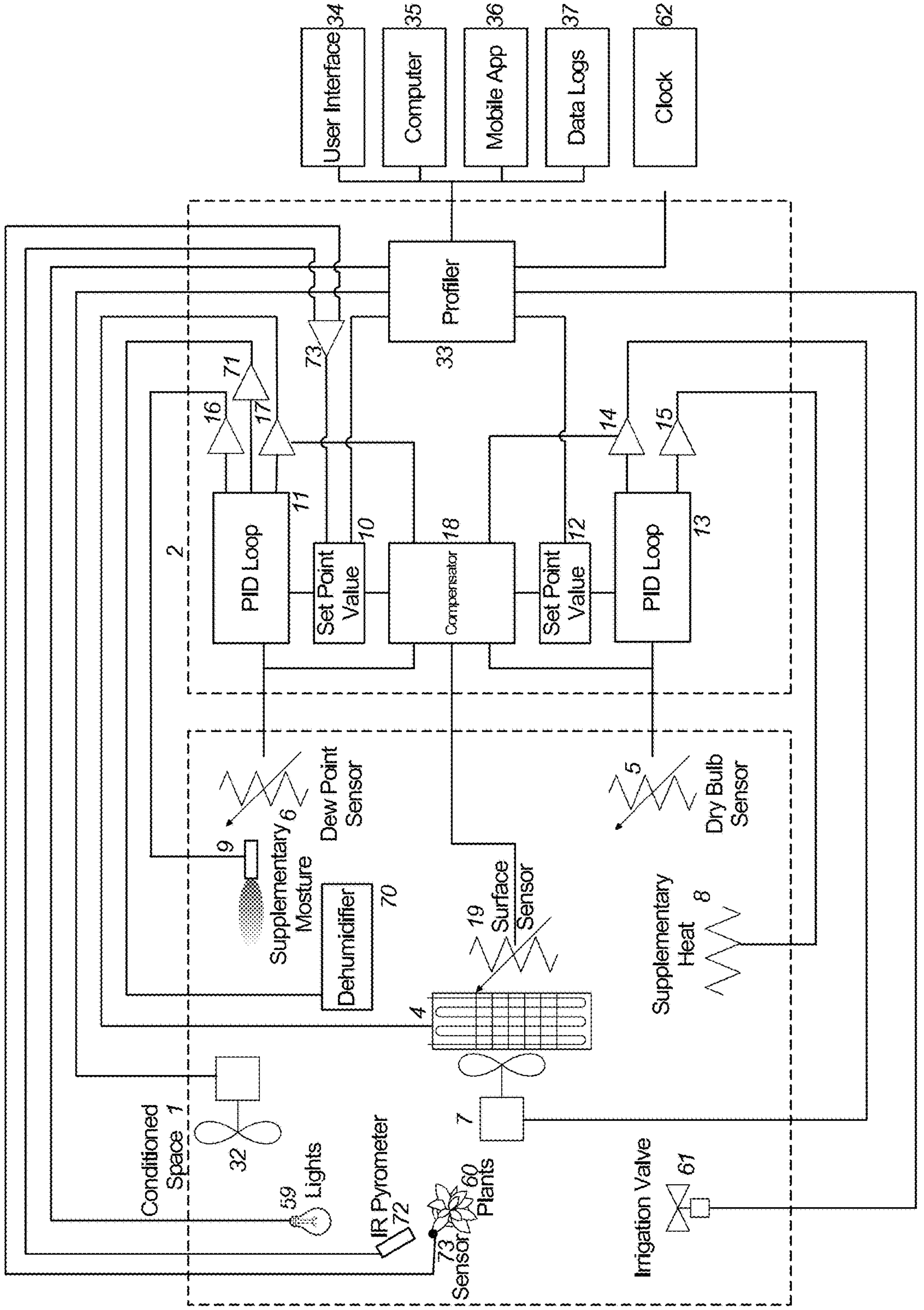
FIG. 14 is a block diagram similar to FIGS. 1, 3, 10, 11, and 13 using the same reference numerals, where appropriate, and adding sensors that sense the temperature of the plant leaves.

Referring to FIG. 14, by measuring the leaf surface temperature with a sensor 73 that is in communication with a leaf of a plant in the grow room, the vapor pressure at the leaf surface can be determined using the relationship Leaf $e_s$=6.11*10^((7.5*Td)/(237.3+Td)), $e_s$ being the vapor pressure at the surface of the leaf and Td being the temperature at the surface of the leaf.

The system disclosed herein can adjust the VPD in the grow room 1 to a desired VPD. The desired VPD may be selected, for example, from a VPD range corresponding to the appropriate phase of the plant growth.

Specifically, the user can select a desired VPD via the user interface 34, the computer 35, or the mobile app 36. Since the dew point can be calculated from the vapor pressure, and the vapor pressure can be calculated from the dew point, based on the user-desired VPD, the desired dew point can be calculated. Target Dew Point=(31.64*LOG((Leaf $e_s$−VPD setpoint)/6.11))/(1−(LOG((Leaf $e_s$−VPD setpoint)/6.11)/7.5)).

The calculated dew point value then is used by the system as the desired dew point set point value 10, instead of the selected dew point set point value as previously described, in order to realize the user-desired VPD. The desired calculated dew point value will change as the leaf surface temperature changes. In order to maintain a constant vapor pressure difference between the leaf surface and the room a new calculated dew point set point 10 replaces the previous dew point set point 10.

A leaf surface temperature sensor 73 that is in contact with the leaf might not be a preferred method to measure the leaf surface temperature due to the mechanical strain on the plant and the possibility of a lack of reliable surface contact for a reliable measurement. An alternate method would be to manually measure the leaf surface temperature with either a contact thermometer, or hand held infrared temperature sensor. A single sample leaf on a plant may be measured in the room, or several samples may be measured, and the average of the measured values can be entered into the user interface 34 for the control to use to calculate the leaf's vapor pressure and then calculate the desired vapor pressure (dew point set point 10) at which to maintain the room in order to have the desired vapor pressure deficit.

An alternative sensor for measuring the leaf surface temperature may be infrared pyrometer 72, which can measure the leaf surface temperature without making contact.

In addition, an infrared pyrometer 72 can measure an area of surface temperature of the plant canopy, which will provide a more representative value in the foliage in the grow room, instead of just a single point measured by a contact sensor.

If desired, multiple infrared pyrometer sensors 72 may be used throughout the grow room. The temperature measurements from the multiple sensors 72 may be then averaged by the system, and the average temperature is then used to calculate the average saturated vapor pressure of the plant canopy. Then, based on the user selectable VPD value, a dew point set point value 10 can be calculated using the average saturated vapor pressure of the plant canopy. The system will then maintain the grow space in the grow room at the user-desired VPD value using the dew point set point value 10 calculated based on the average saturated vapor pressure of the plant canopy.

An additional method to measure the leaf's surface temperature would use an infrared image camera to replace the pyrometer sensor. With the use of artificial intelligence (AI) the individual plant leaves can be identified and the respective temperatures of the leaves can be obtained. The individually identified leaf temperatures can then be averaged to calculate an average canopy temperature which is then used to calculate the saturated vapor pressure, and then the desired dew point set point 10 in order to achieve the desired vapor pressure difference in the grow room.

Another method may be used to maintain the desired VPD without the use of a leaf surface sensor of the contact type or IR types of sensors. The leaf surface temperature is typically above or below the dry bulb temperature of the room. The leaf surface temperature is typically above the dry bulb temperature of the room when the plant is not fully absorbing the light spectrum given off by the lights, and the unabsorbed energy increases the leaf's surface temperature. When the light spectrum and plant absorption are properly matched, the leaf surface temperature will typically be below the room temperature due to evaporative cooling as the water vapor leaving the stomata evaporates. This difference in temperature is typically in a small range and if known, the control can be used to control the VPD in the room based on an estimation of the difference between the actual leaf surface temperature and the temperature of the room. The user will provide/input (via the interface 34, for example) the approximate difference between the room's dry bulb and the leaf surface temperature which the control will use as an offset of the room's dry bulb temperature to calculate the approximate leaf surface saturated vapor pressure and thereby calculate the desired dew point set point 10 in the space to maintain the desired VPD. While this is not a preferred method, it is a solution when actual leaf surface temperature is not available.

Whether the leaf surface temperature at a single point measured using the sensor 73 is used to calculate a dew point set point value 10, the temperature of an area of the plant canopy measured with the pyrometer 72 is used to calculate a dew point set point value 10, or the average saturated vapor pressure of the plant canopy is used to calculate a dew point set point value 10, a method for controlling the VPD to attain and maintain a user-desired VPD in the grow room requires measuring or an approximation of the temperature at the leaf surface(s) in order to determine the leaf surface saturated vapor pressure and thereby a dew point set point value 10.

The determined dew point set point value 10 could be set automatically by the system or may be displayed to the user as a recommendation, and the user may then enter the recommended dew point set point value 10 via the user interface 34, the computer 35, or the mobile app 36, or accept the recommended dew point set point value 10 by clicking an accept button displayed by the user interface 34, the computer 35, or the mobile app 36. In any case, the system will receive a dew point set point value 10 that is determined based on the measured temperature(s) at the leaf surface(s) of the plants in the grow room.

The determined dew point will change as needed to maintain the desired VPD. The desired VPD value can be programmed to change over the plants growth cycle in a manner as shown in FIGS. 4-9.

It should be understood that the described systems provide good illustrations of the principles of the invention and its practical application to thereby enable one of ordinary skill in the art to utilize the invention with various modifications as are suited to the particular use contemplated. All such modifications and variations are within the scope of the invention as determined by the appended claims when interpreted in accordance with the breadth to which they are fairly legally and equitably entitled.

The invention claimed is:

1. A method of controlling environmental conditions in a grow room with a system that includes:

a first sensor to determine the temperature in the grow room, a second sensor to determine the vapor pressure in the grow room, and a controller responsive to dew point in the grow room, wherein the controller comprises two independently controllable PID control loops, one of the two PID control loops controls the temperature in the grow room and the other of the two PID control loops controls the dew point of the grow room, and wherein the system comprises a lighting control controlling the timing of and amount of lighting in the grow room, the lighting control operating in conjunction with the two PID control loops to control the conditions of the grow room, the method comprising:

sensing loss of sensible load of lighting in the grow room with the first sensor, and in response to loss of sensible load of lighting in the grow room, slowing down or preventing condensation on leaves of plants inside the grow room by controlling the dew point in the grow room independent of temperature in the grow room with the other of the two PID control loops to control the vapor pressure deficit in the grow room.

2. The method of claim 1, wherein the slowing down or preventing condensation is carried out by reducing sensible cooling in the grow room.

3. The method of claim 1, wherein the slowing down or preventing condensation is carried out by heating the grow room with supplementary heat.

4. The method of claim 1, further comprising controlling a clock to turn on/off the lighting in the grow room or raising or lowering lighting level with a dimmer in the grow room.

5. The method of claim 1, further comprising providing a profiler that contains temperature set points and dew point set points for a state of no lighting in the grow room and a state of lighting in the grow room, and changing the set points with the profiler when the state of lighting changes in the grow room.

6. The method of claim 5, further comprising disabling or reducing the output of an irrigation system in the grow room when the state of lighting is changing in the grow room from a lighting on state to a lighting off state.

7. The method of claim 1, wherein condensation on leaves of the plants in the grow room is reduced to a level that prevents growth of mold, mildew or microbes on the leaves of the plants, or to a level that prevents pest infestation on leaves of the plants.

8. The method of claim 1, further comprising performing dehumidification when lighting is turned off to slow down or prevent condensation on leaves of plants inside the grow room.

9. The method of claim 1, further comprising performing dehumidification when the dew point in the grow room rises by a predetermined amount above a dew point set point, and terminating dehumidification when the dew point in the grow room falls below the dew point set point by a predetermined amount.

10. The method of claim 1, further comprising performing dehumidification to achieve a predetermined output latent capacity, and terminating dehumidification when output latent capacity falls by a predetermined amount.

11. The method of claim 1, wherein the vapor pressure deficit is controlled to be within a range corresponding to a growth phase of the plants in said grow room.

12. The method of claim 1, wherein the growth phase of the plants in said grow room is propagation/early vegetation phase, late vegetation/early flower phase, or mid/late flower phase.

13. The method of claim 1, further comprising acquiring a temperature value indicative of temperature of at least one leaf of a plant in the grow room or an average temperature of leaves of the plants in the grow room, calculating a dew point value based on the acquired temperature value, and setting the dew point for the grow room to the dew point value to control the vapor pressure deficit.

14. The method of claim 13, wherein the temperature value indicative of temperature of at least one leaf of a plant in the grow room or an average temperature of leaves of the plants in the grow room is acquired by a third sensor.

15. The method of claim 14, wherein the third sensor is a contact thermometer, an infrared temperature sensor, a pyrometer, or an infrared image camera.

16. The method of claim 14, wherein the acquired temperature value is based on an estimate.

* * * * *